United States Patent
Høyer

(10) Patent No.: US 7,081,838 B2
(45) Date of Patent: Jul. 25, 2006

(54) 16B/10S CODING APPARATUS AND METHOD

(75) Inventor: Claus F. Høyer, Expergærde (DK)

(73) Assignee: Enigma Semiconductor, Inc., Santa Clara, CA (US)

( * ) Notice: Subject to any disclaimer, the term of this patent is extended or adjusted under 35 U.S.C. 154(b) by 0 days.

(21) Appl. No.: 11/024,052

(22) Filed: Dec. 29, 2004

(65) Prior Publication Data

US 2006/0139186 A1    Jun. 29, 2006

(51) Int. Cl.
*H03M 5/00* (2006.01)
(52) U.S. Cl. .......................... 341/58; 341/59
(58) Field of Classification Search ............. 341/50–70
See application file for complete search history.

(56) References Cited

U.S. PATENT DOCUMENTS

| | | | |
|---|---|---|---|
| 4,486,739 A | | 12/1984 | Franaszek et al. |
| 5,974,464 A | * | 10/1999 | Shin et al. ................... 341/58 |
| 6,198,413 B1 | * | 3/2001 | Widmer ....................... 341/59 |
| 6,538,584 B1 | * | 3/2003 | Borkar et al. ................ 341/58 |
| 6,614,369 B1 | * | 9/2003 | Widmer ....................... 341/59 |
| 6,696,988 B1 | * | 2/2004 | Chen ............................ 341/50 |
| 6,917,312 B1 | * | 7/2005 | Bessios ........................ 341/56 |
| 2003/0108134 A1 | | 6/2003 | Stonick et al. |
| 2004/0085995 A1 | * | 5/2004 | Gorecki et al. ............. 370/464 |
| 2004/0109509 A1 | | 6/2004 | Stonecypher et al. |

OTHER PUBLICATIONS

J. Zerbe et al., "Equalization and Clock Recovery for a 2.5-10-Gb/s 2-PAM/4-PAM Backbone Transceiver Cell," IEEE Journal of Solid-State circuits, vol. 38, No. 12, Dec. 2003, pp. 2121-2130.

* cited by examiner

*Primary Examiner*—Lam T. Mai
(74) *Attorney, Agent, or Firm*—Foley & Lardner LLP

(57) ABSTRACT

A system and method for improving the quality of transmitted digital signals in a multi-level signaling system wherein digital signals representing more than one bit of information may be transmitted at more than two signal levels on a single transmission medium, includes encoding digital values represented by sets of N bits to provide corresponding sets of P symbols, each set of P symbols being selected to reduce full-swing transitions and to perform DC balancing between successive digital signal transmissions. The system and method further includes transmitting the sets of P symbols over the single transmission medium. Clock data recovery and comma insertions may additionally be provided in alternate configurations.

36 Claims, 5 Drawing Sheets

FIGURE 1A
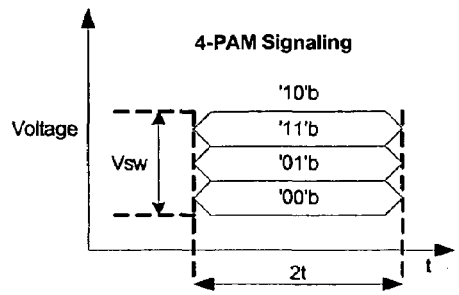
4-PAM Signaling
FIGURE 1B
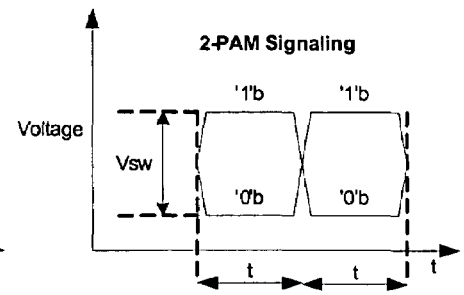
2-PAM Signaling
FIGURE 2
| 19* 18 | 17         10 | 9   8 | 7         0 |
|--------|---------------|-------|-------------|
| 01     | $C_0'$        | M     | $C_1'$      |
*) Bit 19 is MSb of the 2-bit symbol being transmitted first in a codeword
FIGURE 3
|                     | 19 18 | 17 16 | 15 14 | 13 12 | 11 10 | 9 8      | 7         0      |
|---------------------|-------|-------|-------|-------|-------|----------|------------------|
| Codeword            | 01    | 00    | 00    | 00    | 00    | 01 / 11  | $C_1'$           |
| Inverted Codeword   | 11    | 10    | 10    | 10    | 10    | 11 / 01  | Inverted $C_1'$  |
FIGURE 4
|                     | 19 18 | 17          10 | 9 8     | 7 6 | 5 4 | 3 2 | 1 0 |
|---------------------|-------|----------------|---------|-----|-----|-----|-----|
| Codeword            | 01    | $C_0'$         | 01 / 10 | 10  | 10  | 10  | 10  |
| Inverted Codeword   | 11    | Inverted $C_0'$| 11 / 00 | 00  | 00  | 00  | 00  |
FIGURE 5
|                     | 19 18 | 17 16 | 15 14 | 13 12 | 11 10 | 9 8 | 7 6 | 5 4 | 3 2 | 1 0 |
|---------------------|-------|-------|-------|-------|-------|-----|-----|-----|-----|-----|
| Codeword            | 01    | 00    | 00    | 00    | 00    | 01  | 10  | 10  | 10  | 10  |
| Inverted Codeword   | 11    | 10    | 10    | 10    | 10    | 11  | 00  | 00  | 00  | 00  |

FIGURE 6

16B/10S CODING APPARATUS AND METHOD

BACKGROUND OF THE INVENTION

A. Field of the Invention

The invention relates generally to coding, and, more particularly, to a coding scheme that utilizes a multi-level signaling technique, such as PAM-4, to send and receive data and control information over a serial transmission medium.

B. Description of the Related Art

In modern communication systems, unidirectional high-speed serial links are often employed for communication between chips on a board or between boards in a modular system. In this regard, previous and current generation high-speed serial links have almost unanimously employed 2-level NRZ-signaling (Non-Return-to-Zero signaling).

However, as the speed of serial communication links increase into the Gigabit range, designers are increasingly considering abandoning NRZ-encoding on serial links in favor of multi-level signaling, because it reduces the fundamental frequency that is needed to traverse the transmission medium. One such common multi-level signaling method is 4-level signaling, also known as 4-PAM or PAM-4.

U.S. Patent Publication No. 2003/0108134, to Stonick et al., describes a method and apparatus for encoding and decoding digital communication data using PAM-n techniques. In the Stonick et al. reference, transitions between the two most extreme signal levels are eliminated in the encoded sequences.

U.S. Patent Publication 2004/0109509, to Stonecypher et al., describes a technique for improving the quality of digital signals in a multi-level signaling system, whereby sets of N bits are encoded to provide corresponding sets of P symbols, and whereby each of the sets of P symbols are selected to eliminate full-swing transitions between successive digital signal transmissions.

U.S. Pat. No. 4,486,739, to Franaszek et al., describes a byte-oriented DC balancing technique that uses an 8b/10b coder that is partitioned into a 5b/6b plus a 3b/4b coder. The 8b/10b coding scheme is a commonly employed scheme in present day communication systems.

Before being transmitted on a high-speed serial link, data needs to be encoded to obtain certain properties required for reliable communication:

1. A certain bit transition density is required to ensure the receiving clock-data-recovery circuitry is capable of extracting a suitable receive clock from the bit stream.
2. Since data is presented to the receiver as a continuous stream of bits, the receiver needs some information to be able to infer the boundaries of the data words in the bit stream.
3. As most high-speed serial links operate AC-coupled, i.e., they employ a DC-blocking cap in the path between a transmitter and a receiver, the transmitted bit stream needs to be DC-balanced.
4. On a high-speed serial link employing multi-level signaling, it may be advantageous to eliminate any direct transitions between the outer signaling levels, as this will reduce the maximum voltage swing and the maximum slope of the transmitted signal, leading to reduced frequency components and less reflections and crosstalk.

For high-speed serial links using NRZ signaling, the 8b/10b coding scheme, such as the one described in Franaszek et al., has provided a coding scheme that provides the properties #1–#3 (as property #4 is not applicable for such links).

However, the 8b/10b coding scheme is not suitable for use on high-speed serial links using 4-PAM signaling, since on such a link the 8b/10b coding scheme does not guarantee a high transition density or DC-balancing. The 4S/5S coding scheme described in Stonecypher et al. also does not provide for DC-balancing. The problems of clock data recovery for a PAM-4 system are described in "Equalization and Clock Recovery for a 2.5–10 Gb/s 2-PAM/4-PAM Backplane Transceiver Cell," which reference describes an equalization architecture to handle intersymbol interference.

Hence, a new coding scheme is needed that suits the special requirements of a 4-PAM, 8-PAM, or other type of multi-level encoded link with regards to the above requirements.

The present invention is directed to overcoming or at least reducing the effects of one or more of the problems set forth above.

SUMMARY OF THE INVENTION

According to at one aspect of the invention, there is provided a method for improving the quality of transmitted digital signals in a multi-level signaling system wherein digital signals representing more than one bit of information may be transmitted at more than two signal levels on a single transmission medium, in which the method includes a step of encoding digital values represented by sets of N bits to provide corresponding sets of P symbols, each set of P symbols being selected to reduce full-swing transitions and to perform DC balancing between successive digital signal transmissions. The method also includes a step of transmitting the sets of P symbols, wherein N and P are integer values.

According to another aspect of the invention, there is provided method for providing DC balancing for digital signals transmitted over a single transmission medium, in which the method includes a step of defining a codeword space that includes a plurality of pairs of codewords, each of the pairs of codewords including a positive weight codeword and a negative weight codeword that can equally represent a set of N bits of data, the positive and negative weight codewords of each respective pair of codewords being of equal amplitude, N being a positive integer value. The method also includes a step of determining a current disparity on the single transmission medium. The method further includes a step of assigning one of the corresponding pair of codewords for the set of N bits of data such that the current disparity becomes closer to zero, based on the determination. The method still further includes a step of transmitting the one of the one of the corresponding pair of codewords assigned as a plurality of symbols on the single transmission medium.

According to yet another aspect of the invention, there is provided a method of transmitting digital signals in a multi-level signaling system wherein digital signals representing more than one bit of information may be transmitted at more than two signal levels on a single transmission medium. The method includes a step of encoding digital values represented by two consecutive N-bit characters into an R-bit codeword, wherein the R-bit codeword is configured so as to reduce full swings, each of the N-bit characters being designated as either data or control information based on a Q-bit tag associated with each of the N-bit characters. The method also includes a step of transmitting the R-bit codeword as a plurality of PAM-L symbols on the single transmission line, wherein L, N, R and Q are positive integer values, and wherein the R-bit codeword includes a first field that corresponds to a first of the two consecutive N-bit characters and its associated Q-bit tag, a second field that corresponds to a second of the two consecutive N-bit characters and its associated Q-bit tag, and a third field provided between the first and second fields and that is a function of the two consecutive N-bit characters and their associated Q-bit tags.

According to still yet another aspect of the invention, there is provided a method for transmitting digital signals in a multi-level signaling system wherein digital signals representing more than one bit of information may be transmitted at more than two signal levels on a single transmission medium. The method includes a step of encoding digital values represented by sets of N bits to provide corresponding sets of P symbols, each set of P symbols being selected to provide at least one one-step transition between adjacent symbols in the set of P symbols, in a PAM-L encoding scheme. The method further includes a step of transmitting the sets of P symbols on the single transmission line, wherein N and P are integer values, L being an integer value equal to four or an integer multiple of four.

According to still yet another aspect of the invention, there is provided a system for providing DC balancing for digital signals transmitted over a single transmission medium. The system includes a defining unit configured to define a codeword space that includes a plurality of pairs of codewords, each of the pairs of codewords including a positive weight codeword and a negative weight codeword that can equally represent a set of N bits of data, the positive and negative weight codewords of each respective pair of codewords being of equal amplitude, N being a positive integer value. The system further includes a determining unit configured to determine a current disparity on the single transmission medium. The system also includes an assigning unit configured to assign one of the corresponding pair of codewords for set of N bits of data such that the current disparity becomes closer to zero, based on the determination made by the determining unit. The system further includes a transmitting unit configured to transmit the one of the one of the corresponding pair of codewords assigned by the assigning unit as a plurality of symbols on the single transmission medium.

According to another aspect of the invention, there is provided a system for transmitting digital signals in a multi-level signaling system wherein digital signals representing more than one bit of information may be transmitted at more than two signal levels on a single transmission medium. The system includes an encoding unit configured to encode digital values represented by two consecutive N-bit characters into a 2N-bit codeword, wherein the 2N-bit codeword is configured so as to reduce full swings, each of the N-bit characters being designated as either data or control information based on a Q-bit tag associated with each of the N-bit characters. The system further includes a mapping unit configured to map the 2N-bit codeword into an R-bit codeword that includes a first field that corresponds to a first of the two consecutive N-bit characters and its associated Q-bit tag, a second field that corresponds to a second of the two consecutive N-bit characters and its associated Q-bit tag, and a third field disposed between the first and second fields and that is a function of the two consecutive N-bit characters and their associated Q-bit tags, wherein N, R and Q are positive integer values.

According to still yet another aspect of the invention, there is provided a system for system for improving the quality of transmitted digital signals in a multi-level signaling system wherein digital signals representing more than one bit of information may be transmitted at more than two signal levels on a single transmission medium. The system includes an encoding unit configured to encode digital values represented by two consecutive N-bit characters into an R-bit codeword, wherein the R-bit codeword is configured so as to reduce full swings, each of the N-bit characters being designated as either data or control information based on a Q-bit tag associated with each of the N-bit characters. The system also includes a transmitting unit configured to output the R-bit codeword as a plurality of PAM-L symbols, wherein L, N, R and Q are positive integer values, and wherein the R-bit codeword includes a first field that corresponds to a first of the two consecutive N-bit characters and its associated Q-bit tag, a second field that corresponds to a second of the two consecutive N-bit characters and its associated Q-bit tag, and a third field provided between the first and second fields and that is a function of the two consecutive N-bit characters and their associated Q-bit tags.

According to still yet another aspect of the invention, there is provided a system for transmitting digital signals in a multi-level signaling system wherein digital signals representing more than one bit of information may be transmitted at more than two signal levels on a single transmission medium. The system includes an encoding unit configured to encode digital values represented by sets of N bits to provide corresponding sets of P symbols, each set of P symbols being selected to provide at least one one-step transition between adjacent symbols in the set of P symbols, in a PAM-L encoding scheme. The system also includes a transmitting unit configured to transmit the sets of P symbols on the single transmission line, wherein N and P are integer values, L being an integer value equal to four or an integer multiple of four.

BRIEF DESCRIPTION OF THE DRAWINGS

The foregoing advantages and features of the invention will become apparent upon reference to the following detailed description and the accompanying drawings, of which:

FIG. 1A and FIG. 1B respectively show 4-PAM and 2-PAM (NRZ) signaling for data sent over a transmission line;

FIG. 2 shows the fields of a single 20-bit codeword, according to a first embodiment of the invention;

FIG. 3 shows a single 20-bit codeword with an upper character being a comma, according to a second embodiment of the invention;

FIG. 4 shows a single 20-bit codeword with a lower character being a comma, according to a second embodiment of the invention;

FIG. 5 shows a single 20-bit codeword with both an upper character and a lower character being a comma, according to a second embodiment of the invention;

FIG. 6 shows various patterns used for comma detection, according to a second embodiment of the invention;

DETAILED DESCRIPTION OF SPECIFIC EMBODIMENTS

Figures 7, 8:
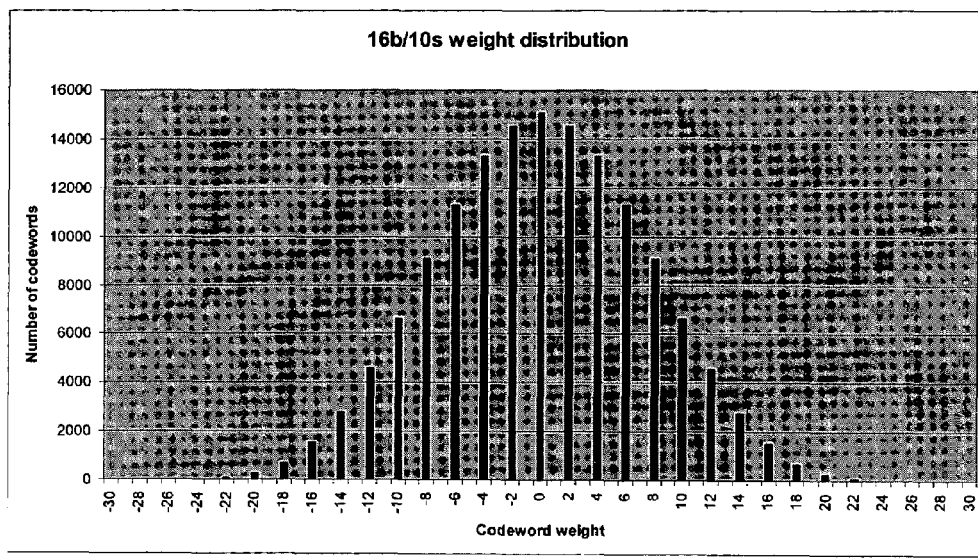
FIG. 7 shows false comma patterns that are eliminated according to a third embodiment of the invention.
FIG. 8 shows a weight distribution of a 16b/10s codeword space, according to at least one embodiment of the invention.

At least one aspect of the present invention relates to a coding scheme that fulfills the requirements necessary for use on a high-speed serial link that uses multi-level (e.g., PAM-4) signals, whereby those requirements include the four requirements described previously. In particular, at least one embodiment of the invention is directed to a 16b/10s codec system and method which has one or more of the following properties: a) is suitable for PAM-4 links, b) encodes two independent P-bit characters into a single N-bit symbol, with no restrictions on the combinations of the two characters, c) provides for complete full swing elimination, for both intersymbol and intrasymbol, d) provides for high bit transition density to ensure high-quality CDR, e) provides for deterministic DC-balancing, f) provides for a unique comma that directly specifies data word boundaries without the need for trial-and-error approaches as done in conventional systems and methods, and g) provides for efficient implementation in digital hardware (e.g., low gate count and high operation frequency).

Before describing embodiments of the present invention in detail, a brief description of 4-PAM signaling, full swing elimination, bit transition density, and DC balancing will be described below, to aid in the understanding of the aspects of the present invention.

NRZ signaling uses just two signaling levels, where, e.g., a low voltage means logic 0 and a high voltage means logic 1, as shown in FIG. 1B. 4-PAM signaling on the other hand is a method used to transmit two bits per symbol using 4 signaling levels, as shown in FIG. 1A. In FIGS. 1A and 1B, Vsw signifies the maximum voltage swing between the various logic levels on the transmission line. The value "t" signifies the symbol period for NRZ, whereby the symbol period for 4-PAM is 2t (since it has 2 bits per symbol).

Each level in the 4-PAM signaling scheme is assigned a two-bit value. In FIG. 1A, a specific Gray-coded representation is used, but other representations can be used instead. Using a Gray-coded representation, however, has the advantage that only a single bit error is introduced when mistaking one level for its neighboring level, as the bit definitions associated with two neighboring signal levels only differ in a single bit position. The two bits that are grouped in 4-PAM signaling are called a 2-bit symbol.

The two 2-bit symbols 00 and 10 are called the extreme 2-bit symbols, while the two 2-bit symbols 01 and 11 are called the midlevel 2-bit symbols.

On high-speed serial links operating in the Giga-Hertz range, it is important to keep the reflections at an absolute minimum to preserve the signal integrity necessary to achieve a sufficiently low Bit-Error-Rate (BER). This is aided by a coding scheme that ensures that all full swings, i.e., transitions from one of the extreme voltage levels directly to the other extreme voltage level, are eliminated. Referring to FIG. 1A, this means that there should be no transitions directly from the 00-level to the 10-level, or vice versa.

A coding scheme that guarantees this is said to perform Full-Swing Elimination (FSE). Any transition directly from one extreme voltage level to the other extreme voltage level is called a Full-Swing Violation (FSV).

The receiver needs to extract the reception clock from the data stream itself by locking a phase-locked loop (PLL) to the transitions in the data stream. This is commonly referred to as Clock-Data-Recovery (CDR). For this to work reliably, a certain bit-transition density is needed at the receiver, otherwise the PLL could drift, leading to the wrong data being captured. The exact requirements depend on the clock-data recovery circuitry in the receiver and the parts-per-million (ppm) deviation that it needs to handle.

In the case of a 4-PAM link, this requirement is a little more subtle than is the case with NRZ. For example, the bit sequence . . . 1 010101010101010 . . . , which would be fine for CDR on a NRZ link, is unusable on a 4-PAM link as it maps into a constant level (either the 01-level or the 10-level, depending on the 2-bit symbol boundary). Furthermore, to prevent the CDR circuitry from inducing jitter, only single-level changes are used for CDR; this corresponding to the six one-step transitions 00/01, 01/11 and 11/10.

DC-balancing is the process of ensuring that the voltage at the receiver of an AC-coupled serial link does not drift over time outside of the receiver common mode range. This happens if the bit stream being transmitted has a constant positive or negative bias for an extended period of time. For the purpose of analyzing the DC-characteristics of a bit sequence on a 4-PAM serial link, the four signaling levels are associated with a weight or +3, −3, +1 or −1, as shown below:

10: +3
11: +1
01: −1
00: −3

The weight values can be arbitrarily chosen, though the weight distance between any two neighboring levels is constant (two in this instance), because the physical signaling levels are spaced equally apart. In a real implementation, because of production inaccuracies, the eye-heights will typically not be exactly identical. This results in the common mode voltage of a perfectly DC-balanced coding scheme having a non-zero value. As long as this inaccuracy is reasonably small, this will not affect the performance of the receiver.

The description hereinbelow details, for at least one embodiment, the specific requirements for a coding scheme suitable for use on high-speed serial links employing 4-PAM signaling. In addition to the electrical requirements described previously, a coding scheme should have other capabilities with respect to the actual data content being carried on the high-speed serial link, as outlined below.

A coding scheme should be able to transparently convey additional control information, such as data packet delimiters, in the same physical high-speed serial link that carries the data. Thus, it is necessary to encode additional control information that is readily distinguishable from the data. The term 'character' is defined to signify either a 'data character' (typically a byte with $2^8$=256 possible values), or a 'control character' (with a small number of possible values). A high-speed serial link carries a sequence of encoded characters.

The conventional 8b/10b codec defines 256 data characters and 12 control characters. The present embodiment provides for a 4-PAM coding scheme that is compatible with the 8b/10b codec at the (unencoded) character level. That way, a conversion from a conventional 8b/10b system/method to a system/method according to an embodiment of the present invention can be done in a relatively simple manner.

Overall, a coding scheme for use on high-speed serial links employing 4-PAM signaling should generally fulfill the requirements listed below:

1. Perform full swing elimination (FSE).
   a. No transitions from 00 to 10 (−3 to +3), or from 10 to 00 (+3 to −3)
2. Guarantee a high transition density.
   a. For example, based on empirical data, as determined by the inventor, the distance between two valid CDR-transitions should be no more than 40 bits (20 2-bit symbols)
3. Guarantee deterministic DC-balancing.
   a. For example, based on empirical data, as determined by the inventor, it is determined that the DC level can at most be offset as much as is caused by having 10 consecutive, identical, extreme 2-bit symbol pairs (e.g. 00 00 00 00 00 00 00 00 00 00) (i.e. 20 bits worth of data)
4. The receiver should be able to achieve link synchronization, i.e., be able to correctly decode the received data, based on a well-behaved data stream containing certain comma characters, i.e., without requiring an explicit link training sequence, as is done in conventional systems.
5. Support the coding of the conventional 8b/10b character set.
   a. 256 data characters
   b. 12 control characters, plus a 13$^{th}$ control character that forces a decoding error. This 13$^{th}$ control character, known as K0.7, is an extension to the original 8b/10b character set, and is used by a transmitter to deterministically force decoding errors at the receiver without otherwise violating the properties of the coding scheme.
   c. At least one of the 8b/10b commas should have the comma property in the 16b/10s coding scheme to facilitate easy alignment at the receiver based only on this comma property. If only one comma is supported, it is preferably K28.5.
6. Efficient implementation in digital hardware of both the encoder and the decoder.

The above requirements are desired, but are all not required for every embodiment falling within the scope of the present invention.

The design of a PAM-4 coding scheme in accordance with a first embodiment of the present invention will be described below in detail. A block-oriented encoder transforms a data stream into equal sized codewords. The term 'disparity' is used to refer to the weight of a codeword. The weight of a codeword is the sum of the weights of its 2-bit symbols. The term 'current disparity' is used for the current DC-imbalance on the serial link. Both the disparity and the current disparity can be positive or negative integers, or be zero (0).

The unencoded data stream operated upon by the conventional 8b/10b coding scheme consists of a character set containing 256 data characters and 13 control characters, represented by 8 data bits (D7–D0) and a single control bit (Z) that determines if a character is a data character (Z=0) or a control character (Z=1). When Z=1, only 13 out of the 256 possible values on D7–D0 are valid, as designated in the 8b/10b coding scheme. As described previously, the 13$^{th}$ control character (K0.7) is an extension to the original 8b/10b coding scheme, and it is only recognized by the encoder, thereby causing a decoding error at the receiver. This representation of unencoded data is simply referred to as a 'character' in the following.

The 8b/10b encoder transforms each of these 8+1 bit characters into 10-bit codewords. In at least one embodiment of the present invention, most of these codewords exist in two variants, one with a positive disparity and one with a negative disparity, and the encoder selects which one to use based on the current disparity in order to keep the link DC-balanced.

For an NRZ code like the 8b/10b code, all $2^{10}$=1024 codewords are in principle valid. While some of these codewords cannot be used to ensure adequate bit-transition density, or to ensure that the special comma-properties are preserved, the existence of the 8b/10b code evidences that there are sufficient combinations that a DC-balanced coding scheme can be suitably defined.

The FSE criteria for a 4-PAM coding scheme means that not all 10-bit codewords (corresponding to five consecutive 2-bit symbols) are valid. Additionally, it is not sufficient to ensure that a single codeword does not have any FSV; it is also required to ensure that there will be no FSVs when any codeword is preceded or followed by any other valid codeword, i.e., that there cannot be a FSV at a codeword boundary.

To eliminate the possibility for a FSV on a codeword boundary, the present invention defines all codewords to start with one of the mid-level 2-bit symbols (01 or 11). Assuming that this is the case, it is found that:

There are 178 valid codewords of the form 01xxxxxxxx without FSV

There are 178 valid codewords of the form 11xxxxxxxx without FSV

While this is sufficient to define a coding scheme that has FSE, the number of valid codewords may not be sufficient to make such a coding scheme DC-balanced, which requires approximately 2*(256+13) different codewords (not taking codewords of zero weight into account).

To ensure DC-balancing for the new coding scheme, it is therefore necessary to define a coding scheme that operates on codewords larger than 10 bits. Accordingly, the next step, assuming the same 25% coding overhead as the 8b/10b coding scheme, is to define a coding scheme that maps two characters (each represented by 8+1 bits) into a single 20 bit codeword. Because 20 bits are represented by ten (10) consecutive 2-bit symbols on a 4-PAM link, the present invention uses the term '16b/10s' to define such a coding scheme.

The 16b/10s coding scheme operates on two independent characters, referred to as a 'character pair.' Each character in the character pair can be one of 256 data characters and 13 control characters. Hence, there are $(256+13)^2$=72,361 combinations of character pairs that the 16b/10s coding scheme has to map to different valid codewords.

To eliminate the possibility for FSV on a codeword boundary, a preferred implementation of the first embodiment defines all codewords to start with one of the midlevel 2-bit symbols (01 or 11). Other coding schemes are possible, as would be understood to those skilled in the art based on the present teachings, without departing from the spirit and scope of the present invention. In the preferred implementation of the first embodiment, it is determined that:

There are 102,010 valid codewords of the form 01xxxxxxxxxxxxxxxxxx without FSV

There are 102,010 valid codewords of the form 11xxxxxxxxxxxxxxxxxx without FSV

With respect to DC-balancing, each codeword has a positive, negative or zero (0) disparity. The coding scheme according to a preferred implementation of the preferred embodiment provides that each of the character pairs has two valid codewords, one with a positive disparity P⁺ and another with a negative disparity P⁻=−P⁺. Codewords having zero disparity need not be paired with another codeword, since −0=+0. DC-balance is then achieved by the following algorithm, according to a preferred implementation of the first embodiment:

If the current disparity is positive, choose the codeword with negative disparity P⁻

If the current disparity is negative, choose the codeword with positive disparity P⁺

If the current disparity is 0, choose either of the codewords P⁻ and P⁺

Assume the maximum positive disparity of any codeword is $P_{max}$ and the maximum negative disparity of any codeword is $P_{min}=-P_{max}$. The worst-case values for the current disparity (DC-imbalance) that can happen are thus $P_{min}$ and $P_{max}$.

For every codeword associated with a character pair, a relation between the codeword with disparity P⁻ and the codeword with disparity P⁺ is defined in a preferred implementation of the first embodiment. Consider the following transformation between 2-bit symbols, defined by inverting the MSb of a 2-bit symbol:

00(−3)⇔10(+3)
01(−1)⇔11(+1)

If this transformation is performed independently on each of the 10 2-bit symbols that exist in a 16b/10s codeword C, the codeword C will transform into another codeword C' that has the opposite-signed disparity. Furthermore, if the codeword C is valid with respect to not having any FSV, the codeword C' should also be valid. This is true even at the boundary of the codeword C', because of the way FSV is eliminated at the boundary, by the definition that no FSV can occur on the boundary of a codeword because at least one of the codewords will have one of the midlevel 2-bit symbols here, and because they transform to each other.

By applying this method, a bijective relation can be established between the two groups of each 102,010 valid codewords described previously.

A DC-balanced 16b/10s coding scheme that maps a character pair into a 20-bit codeword has been developed. The coding can be defined as follows:

Each character pair maps to a valid codeword of the form 01xxxxxxxxxxxxxxxxxx

If a codeword with the opposite disparity sign is needed (based on the current disparity on the transmission line), the corresponding codeword of the form 11xxxxxxxxxxxxxxxxxx is chosen.

Thus, in a further refinement of a 16b/10s coding scheme, the DC-balancing property can be ignored and efforts can be concentrated on finding a mapping from all character pairs to a 20-bit codeword of the form 01xxxxxxxxxxxxxxxxxx that has all the other required properties.

A basic character mapping utilized in a preferred implementation of the first embodiment is described below in detail. As noted, a coding scheme was developed that maps a character pair into a 20-bit codeword. To minimize the implementation complexity, it is highly desirable that the mapping of a character pair be performed as two parallel, independent mappings of each of the two characters, to achieve parallel processing that speeds up the encoding process. Described hereinbelow is a mapping that has this parallel processing property, whereby modifications to this mapping to meet the comma and transition density requirements are described below in detail.

The mapping for the general case according to the first embodiment is shown in FIG. 2, whereby the 20-bit codeword includes a two-bit suffix field, a first character field C0', a two-bit mid-field M, and a second character field C1'.

The mapping is preferably performed by way of the following algorithm:

1. The two unencoded characters are $C_0\{Z_0, D_0\}$ and $C_1=\{Z_1, D_1\}$, where $Z_0$ and $Z_1$ are 1-bit quantities, and $D_0$ and $D_1$ are 8-bit quantities
2. Define two bits $M_0$ and $M_1$
3. Define a function Reverse (b) that given an 8-bit sequence $b=b_7b_6b_5b_4b_3b_2b_1b_0$ returns another 8-bit sequence $b'=b_1b_0b_3b_2b_5b_4b_7b_6$, i.e., where the order of the four 2-bit symbols are reversed
4. Define a function $MustMap_0(c)$ that given a character $C_0$ as defined above returns 1 if $C_0$ is a control character, or if $D_0$ generates a FSV when preceded by the 2-bit symbol 01 and followed by the 2-bit symbol 00, and returns 0 otherwise
5. Define a function $MustMap_1(c)$ that given a character $C_1$ as defined above returns 1 if $C_1$ is a control character, or if $D_1$ generates a FSV when preceded by the 2-bit symbol 00 and followed by the 2-bit symbol 01, and returns 0 otherwise
6. Define a function $Map_0(c)$ that given a character c returns a corresponding 8-bit pattern c' that has no FSV assuming c' is preceded by the 2-bit symbol 01 and followed by the 2-bit symbol 10
7. Define a function $Map_1(c)$ that given a character c returns a corresponding 8-bit pattern c' that has no FSV assuming c' is preceded by the 2-bit symbol 10 and followed by the 2-bit symbol 01
8. Let $M_0=MustMap_0(C_0)$:
   a. If $M_0==0$, let $C_0'=Reverse(D_0)$
   b. Else $C_0'=Map_0(C_0)$
9. Let $M_1=MustMap_1(C_1)$:
   a. If $M_1==0$, let $C_1'=D_1$
   b. Else $C_1'=Map_1(C_1)$ Using this algorithm, the two characters $C_0$ and $C_1$ can be mapped completely independently of each other, and only M depends on both characters, but with a relatively simple relationship. Note that because the "problematic" bit pattern 00 is in the middle of the codeword between $C_0'$ and $C_1'$, the bit patterns for $C_0'$ that cause no FSV are not the same as the bit patterns for $C_1'$ that cause no FSV. But, for every single bit pattern that does not cause FSV for $C_1'$, the bit pattern $Reverse(C_1')$ does not cause FSV for $C_0'$. Thus, the Reverse( ) function is introduced to ensure that when $D_0=Reverse(D_1)$ (and $Z_0=Z_1$), the mapping performed on the characters $C_0$ and $C_1$ are the same. This is a desirable property since it creates a fairly simple relationship between the two independent mapping functions used on $C_0$ and $C_1$.

If there are requirements for a comma definition and a desire to guarantee a certain bit transition density, to be described in detail below, the mapping of $C_0$ and $C_1$ may be more elaborate, as described below with respect to the second embodiment. The decision on what characters to map, and the actual mapping of each of the two characters, cannot be made completely independent of each other; and the definition of M may be more complex. Thus, the general case that has been described above with respect to the first embodiment may be extended to also handle these exceptional cases, in the second embodiment.

The actual mappings performed by the functions $Map_0(c)$ and $Map_1(c)$ are described in detail below.

To be able to perform correct decoding of codewords, the receiver needs to determine the boundaries of the codewords before decoding them. A common way to determine such boundaries is by defining one or more codewords with comma properties (such a codeword is simply referred to as a 'comma'). A comma is defined as a unique bit pattern of a certain length that allows a receiver to determine the boundary of the codewords in the received bit stream, i.e., the pattern can only occur in certain bit-positions within a codeword, and never across codeword boundaries.

Of the 13 control characters defined by the 8b/10b coding scheme, three (3) of them are mapped into codewords with comma properties. These 3 commas are known as K28.1, K28.5 and K28.7. The latter, however, has some unfortunate properties that could cause false comma-patterns to occur across codeword boundaries, leaving only two commas (K28.1, K28.5) for actual use.

If properly designed, any protocol can operate with just a single comma. For the 16b/10s coding scheme according to a preferred implementation of the second embodiment, it is defined that a character pair where one or both of the characters is the 8b/10b control character K28.5 maps into a codeword that have comma properties. Thus, the K28.5 symbol can thus appear in either the upper character ($C_0$) or the lower character ($C_1$), or both characters, and therefore the comma needs to be different in the upper and lower part of the codeword.

Furthermore, the comma needs to be unique even after the DC-balancing algorithm may have inverted the codeword containing one or two commas, because the codeword inversion can not be performed by the receiver until the codeword boundaries have been determined. Hence, the comma definition should be carefully made, as shown in FIG. 3, FIG. 4 and FIG. 5.

In particular, FIG. 3 shows a 20-bit codeword according to the second embodiment in which the upper character C0 is a comma, FIG. 4 shows a 20-bit codeword according to the second embodiment in which the lower character C1 is a comma, and FIG. 5 shows a 20-bit codeword according to the second embodiment in which both the upper and lower characters C0, C1 are commas.

The comma definitions to be utilized in a preferred implementation of the second embodiment are summarized as follows:

1. The bit patterns 0100000000 and 1110101010 when immediately followed by 01 or 11, can only occur in bit positions 19–10
2. The bit patterns 1010101010 and 0000000000 when immediately followed by 01 or 11 can only occur in bit positions 9–0
3. The bit patterns 0110101010 and 1100000000 when immediately followed by 01 or 11, can only occur in bit positions 9–0

Figure 6:
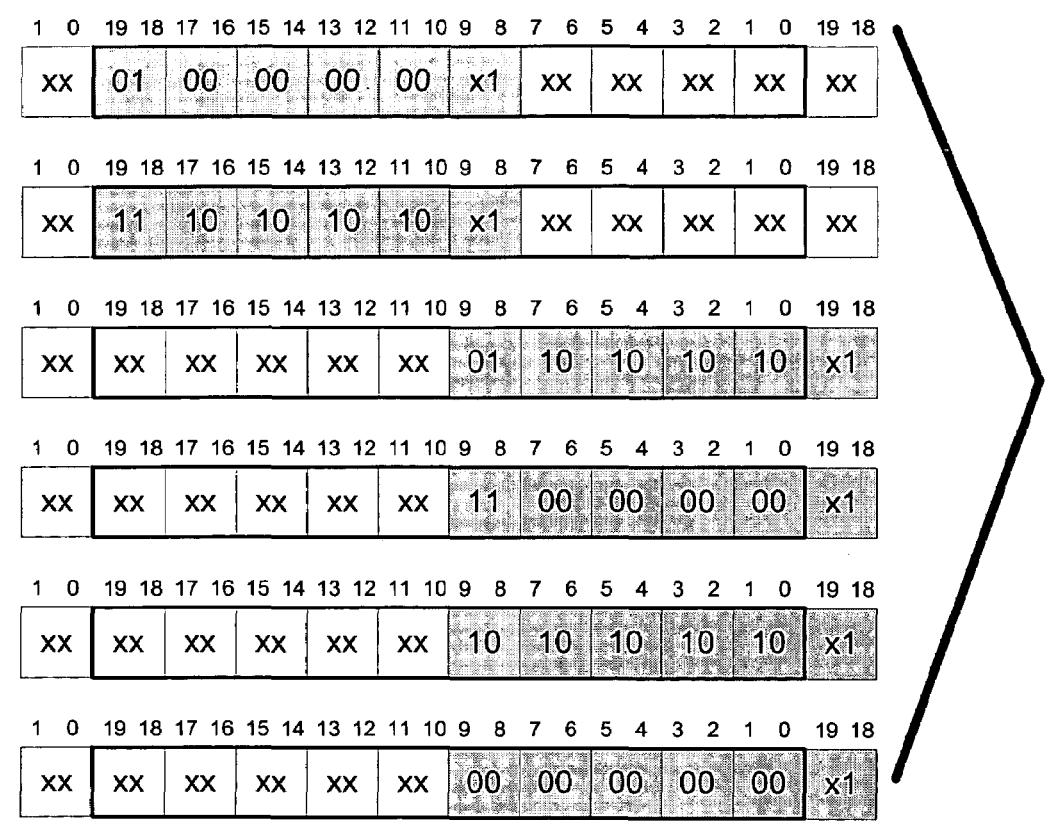

Accordingly, in order to distinguish between the different commas, it is necessary to look at 12 bits at a time, and the encoding/decoding scheme cannot just look for the 10 comma bits. FIG. 6 shows the specific 12 bit patterns to look for, and the corresponding codeword alignment they specify.

Thus, in a preferred implementation of the second embodiment, $\text{Map}_0(\text{K28.5})$=00000000 and $\text{Map}_1(\text{K28.5})$=10101010. The character {0, 00000000} that conflicts with the comma definition, but does not contain a FSV, is therefore nevertheless mapped by $\text{Map}_0()$ and $\text{Map}_1()$. The character {0, 10101010} that also conflicts with the comma definition is already mapped by $\text{Map}_0()$ and $\text{Map}_1()$ because it contains a FSV.

The definition of the codeword field M described previously for the first embodiment (the general case) is no longer valid when the comma definitions shown in FIG. 3, FIG. 4 and FIG. 5 are introduced. Hence, in this case, the definition of M as used in the second embodiment is extended to cover these cases as described in the following:

1. If both $C_0$ and $C_1$ are K28.5s, M=01 (M would normally have been 10 in this case—both characters are mapped—but this would generate a FSV)
2. Else if $C_0$ is a K28.5, M={$^-M_1$, 1}, where $M_1$ is defined previously (the general definition of M risks introducing a FSV in this case)

Note that the third case where $C_1$ is a K28.5 codeword and $C_0$ is not does not need special treatment, as it is covered by the general case.

It is preferable to define the mapping of the characters in a way that prevents false commas from being generated, and this is done in a third embodiment of the present invention. As all of the commas defined above contain the 8-bit patterns 00000000 or 10101010, false commas can be prevented by ensuring that these patterns only occur in the commas themselves. These patterns do not occur across codeword boundaries, because a codeword always starts with either 01 or 11. FIG. 7 shows the false comma patterns that can occur in a codeword.

The first and last of the false comma patterns shown in FIG. 7 are eliminated by ensuring that after the character mapping, $C_0'$ does not contain the pattern xx000000 or xx101010, and similarly that $C_1'$ does not contain the pattern 000000xx or 101010xx. This means that a few characters that does not have any FSV must nevertheless be remapped, so the functions $\text{MustMap}_0()$ and $\text{MustMap}_1()$ defined previously for the general case are extended appropriately in the third embodiment.

For the two middle cases shown in FIG. 7, however, there are not enough valid mappings that it is possible to ensure that $C_0'$ does not contain the pattern xxxx0000 or xxxx1010, and that $C_1'$ does not contain the pattern 0000xxxx or 1010xxxx. The false commas occurring due to these patterns are therefore eliminated by another approach, as described by the following algorithm:

1. If the generated codeword is of the form xx xxxx0000 00 00xxxxxx ($C_0'$=xxxx0000, M=00 and $C_1'$=00xxxxxx) or xx xxxxxx00 00 0000xxxx ($C_0'$=xxxxxx00, M=00 and $C_1'$=0000xxxx), change M to 01, changing the codeword to either xx xxxx0000 01 00xxxxxx or xx xxxxxx00 01 0000xxxx These new codewords are unique, because M=01 means that $C_1$ has been subject to a mapping by $\text{Map}_1()$, but in the normal mapping $C_1'$=$\text{Map}_1(C_1)$, $C_1'$=00xxxxxx or $C_1'$=0000xxxx will never occur, as per definition $C_1'$ will not generate a FSV when preceded by 10
2. If the generated codeword is of the form xx xxxx1010 10 10xxxxxx ($C_0'$=xxxx1010, M=10 and $C_1'$=10xxxxxx) or xx xxxxxx10 10 1010xxxx ($C_0'$=xxxxxx10, M=10 and $C_1'$=1010xxxx), change M to 01, changing the codeword to either xx xxxx1010 01 10xxxxxx or xx xxxxxx10 01 1010xxxx. These new codewords are unique, because M=01 means that $C_0$ has not been subject to a mapping by $\text{Map}_0()$, but in that case $C_0'$=$C_0$, and $C_0'$=xxxxxx10 or $C_0'$=xxxx1010 will never occur, as per definition $C_0$ will not generate a FSV when followed by 00

Note that the algorithm described in item 1 and item 2 above is not an extension to the MustMapO( ), MustMap1( ), Map0( ) or Map1( ) functions, but is merely a post processing of the codeword M field after it has been generated by the algorithm described previously for the general case (the first embodiment).

The false comma elimination algorithm described above with respect to the third embodiment is also in effect when one or both of the characters are commas. Specifically, this means that in the case shown in FIG. 4 where $C_1'$ is a comma of the form 1010101010, it will be converted into 0110101010 if $C_0'$=xxxxxxxx10. However, since 1010101010 and 0110101010 are both used as commas in the exact same codeword position, this has no impact on the comma properties of the coding scheme. The same reasoning is made for the DC-balanced counterpart of 1010101010, 0000000000, also shown in FIG. 4.

The functions $Map_0(\ )$ and $Map_1(\ )$ have been defined previously for the general case, and these functions were extended to account for commas and false commas, as discussed above. These functions can be extended further into the functions $FullMap_0(\ )$ and $FullMap_1(\ )$ that are defined for all input characters, i.e., that also include the cases where no mapping takes place. Table 1 shows the specific mappings performed by $FullMap_0(\ )$ and $FullMap_1(\ )$, as well as the output of the $MustMap_0(\ )$ and $MustMap_1(\ )$ functions, alongside the reason why each character needs to be mapped (for informational purposes). As one example, the mapping table of Table 1 is utilized to achieve these specific mappings, whereby a program stored in a memory accessible by a computer, or a special purpose computer, may be utilized to perform such mappings (e.g., with the mapping tables stored in memory).

TABLE 1

Character Mapping Functions

| Character name | Hex value (c) | Binary value Z $b_7b_6b_5b_4b_3b_2b_1b_0$ | $FullMap_0(c)$ $b_7b_6b_5b_4b_3b_2b_1b_0$ | $FullMap_1(c)$ $b_7b_6b_5b_4b_3b_2b_1b_0$ | $MustMap_0(c)/$ reason | $MustMap_1(c)/$ reason |
|---|---|---|---|---|---|---|
| D0.0 | 0x000 | 0 00000000 | 00000011 | 11000000 | 1/FC | 1/FC |
| D1.0 | 0x001 | 0 00000001 | 01000011 | 11000001 | 1/FC | 1/FC |
| D2.0 | 0x002 | 0 00000010 | 10100111 | 11011010 | 1/FC, FSV | 1/FC, FSV |
| D3.0 | 0x003 | 0 00000011 | 11100111 | 11011011 | 1/FC | 1/FC |
| D4.0 | 0x004 | 0 00000100 | 00010000 | 00000100 | 0/— | 0/— |
| D5.0 | 0x005 | 0 00000101 | 01010000 | 00000101 | 0/— | 0/— |
| D6.0 | 0x006 | 0 00000110 | 10010000 | 00000110 | 0/— | 0/— |
| D7.0 | 0x007 | 0 00000111 | 11010000 | 00000111 | 0/— | 0/— |
| D8.0 | 0x008 | 0 00001000 | 00010111 | 11010100 | 1/FSV | 1/FSV |
| D9.0 | 0x009 | 0 00001001 | 01010111 | 11010101 | 1/FSV | 1/FSV |
| D10.0 | 0x00A | 0 00001010 | 10010111 | 11010110 | 1/FSV | 1/FSV |
| D11.0 | 0x00B | 0 00001011 | 11010111 | 11010111 | 1/FSV | 1/FSV |
| D12.0 | 0x00C | 0 00001100 | 00110000 | 00001100 | 0/— | 0/— |
| D13.0 | 0x00D | 0 00001101 | 01110000 | 00001101 | 0/— | 0/— |
| D14.0 | 0x00E | 0 00001110 | 10110000 | 00001110 | 0/— | 0/— |
| D15.0 | 0x00F | 0 00001111 | 11110000 | 00001111 | 0/— | 0/— |
| D16.0 | 0x010 | 0 00010000 | 00000100 | 00010000 | 0/— | 0/— |
| D17.0 | 0x011 | 0 00010001 | 01000100 | 00010001 | 0/— | 0/— |
| D18.0 | 0x012 | 0 00010010 | 00000111 | 11010000 | 1/FSV | 1/FSV |
| D19.0 | 0x013 | 0 00010011 | 11000100 | 00010011 | 0/— | 0/— |
| D20.0 | 0x014 | 0 00010100 | 00010100 | 00010100 | 0/— | 0/— |
| D21.0 | 0x015 | 0 00010101 | 01010100 | 00010101 | 0/— | 0/— |
| D22.0 | 0x016 | 0 00010110 | 10010100 | 00010110 | 0/— | 0/— |
| D23.0 | 0x017 | 0 00010111 | 11010100 | 00010111 | 0/— | 0/— |
| D24.0 | 0x018 | 0 00011000 | 01000111 | 11010001 | 1/FSV | 1/FSV |
| D25.0 | 0x019 | 0 00011001 | 01100100 | 00011001 | 0/— | 0/— |
| D26.0 | 0x01A | 0 00011010 | 10100100 | 00011010 | 0/— | 0/— |
| D27.0 | 0x01B | 0 00011011 | 11100100 | 00011011 | 0/— | 0/— |
| D28.0 | 0x01C | 0 00011100 | 00110100 | 00011100 | 0/— | 0/— |
| D29.0 | 0x01D | 0 00011101 | 01110100 | 00011101 | 0/— | 0/— |
| D30.0 | 0x01E | 0 00011110 | 10110100 | 00011110 | 0/— | 0/— |
| D31.0 | 0x01F | 0 00011111 | 11110100 | 00011111 | 0/— | 0/— |
| D0.1 | 0x020 | 0 00100000 | 10011111 | 11110110 | 1/FSV | 1/FSV |
| D1.1 | 0x021 | 0 00100001 | 01110111 | 11011101 | 1/FSV | 1/FSV |
| D2.1 | 0x022 | 0 00100010 | 10110111 | 11011110 | 1/FSV | 1/FSV |
| D3.1 | 0x023 | 0 00100011 | 11110111 | 11011111 | 1/FSV | 1/FSV |
| D4.1 | 0x024 | 0 00100100 | 00010011 | 11000100 | 1/FSV | 1/FSV |
| D5.1 | 0x025 | 0 00100101 | 01010011 | 11000101 | 1/FSV | 1/FSV |
| D6.1 | 0x026 | 0 00100110 | 10010011 | 11000110 | 1/FSV | 1/FSV |
| D7.1 | 0x027 | 0 00100111 | 11010011 | 11000111 | 1/FSV | 1/FSV |
| D8.1 | 0x028 | 0 00101000 | 00011111 | 11110100 | 1/FSV | 1/FSV |
| D9.1 | 0x029 | 0 00101001 | 01011111 | 11110101 | 1/FSV | 1/FSV |
| D10.1 | 0x02A | 0 00101010 | 10101011 | 11101010 | 1/FSV | 1/FSV |
| D11.1 | 0x02B | 0 00101011 | 11101011 | 11101011 | 1/FSV | 1/FSV |
| D12.1 | 0x02C | 0 00101100 | 00111011 | 11101100 | 1/FSV | 1/FSV |
| D13.1 | 0x02D | 0 00101101 | 01111011 | 11101101 | 1/FSV | 1/FSV |
| D14.1 | 0x02E | 0 00101110 | 10111011 | 11101110 | 1/FSV | 1/FSV |
| D15.1 | 0x02F | 0 00101111 | 11111011 | 11101111 | 1/FSV | 1/FSV |
| D16.1 | 0x030 | 0 00110000 | 00001100 | 00110000 | 0/— | 0/— |
| D17.1 | 0x031 | 0 00110001 | 01001100 | 00110001 | 0/— | 0/— |
| D18.1 | 0x032 | 0 00110010 | 00001111 | 11110000 | 1/FSV | 1/FSV |
| D19.1 | 0x033 | 0 00110011 | 11001100 | 00110011 | 0/— | 0/— |
| D20.1 | 0x034 | 0 00110100 | 00011100 | 00110100 | 0/— | 0/— |
| D21.1 | 0x035 | 0 00110101 | 01011100 | 00110101 | 0/— | 0/— |
| D22.1 | 0x036 | 0 00110110 | 10011100 | 00110110 | 0/— | 0/— |
| D23.1 | 0x037 | 0 00110111 | 11011100 | 00110111 | 0/— | 0/— |
| D24.1 | 0x038 | 0 00111000 | 01001111 | 11110001 | 1/FSV | 1/FSV |

TABLE 1-continued

Character Mapping Functions

| Character name | Hex value (c) | Binary value Z $b_7b_6b_5b_4b_3b_2b_1b_0$ | FullMap$_0$(c) $b_7b_6b_5b_4b_3b_2b_1b_0$ | FullMap$_1$(c) $b_7b_6b_5b_4b_3b_2b_1b_0$ | MustMap$_0$(c)/ reason | MustMap$_1$(c)/ reason |
|---|---|---|---|---|---|---|
| D25.1 | 0x039 | 0 00111001 | 01101100 | 00111001 | 0/— | 0/— |
| D26.1 | 0x03A | 0 00111010 | 10101100 | 00111010 | 0/— | 0/— |
| D27.1 | 0x03B | 0 00111011 | 11101100 | 00111011 | 0/— | 0/— |
| D28.1 | 0x03C | 0 00111100 | 00111100 | 00111100 | 0/— | 0/— |
| D29.1 | 0x03D | 0 00111101 | 01111100 | 00111101 | 0/— | 0/— |
| D30.1 | 0x03E | 0 00111110 | 10111100 | 00111110 | 0/— | 0/— |
| D31.1 | 0x03F | 0 00111111 | 11111100 | 00111111 | 0/— | 0/— |
| D0.2 | 0x040 | 0 01000000 | 00000001 | 01000000 | 0/— | 0/— |
| D1.2 | 0x041 | 0 01000001 | 01000001 | 01000001 | 0/— | 0/— |
| D2.2 | 0x042 | 0 01000010 | 11000001 | 01000011 | 1/FSV | 1/FSV |
| D3.2 | 0x043 | 0 01000011 | 11000001 | 01000011 | 0/— | 0/— |
| D4.2 | 0x044 | 0 01000100 | 00010001 | 01000100 | 0/— | 0/— |
| D5.2 | 0x045 | 0 01000101 | 01010001 | 01000101 | 0/— | 0/— |
| D6.2 | 0x046 | 0 01000110 | 10010001 | 01000110 | 0/— | 0/— |
| D7.2 | 0x047 | 0 01000111 | 11010001 | 01000111 | 0/— | 0/— |
| D8.2 | 0x048 | 0 01001000 | 00110001 | 01001100 | 1/FSV | 1/FSV |
| D9.2 | 0x049 | 0 01001001 | 01110001 | 01001101 | 1/FSV | 1/FSV |
| D10.2 | 0x04A | 0 01001010 | 10110001 | 01001110 | 1/FSV | 1/FSV |
| D11.2 | 0x04B | 0 01001011 | 11110001 | 01001111 | 1/FSV | 1/FSV |
| D12.2 | 0x04C | 0 01001100 | 00110001 | 01001100 | 0/— | 0/— |
| D13.2 | 0x04D | 0 01001101 | 01110001 | 01001101 | 0/— | 0/— |
| D14.2 | 0x04E | 0 01001110 | 10110001 | 01001110 | 0/— | 0/— |
| D15.2 | 0x04F | 0 01001111 | 11110001 | 01001111 | 0/— | 0/— |
| D16.2 | 0x050 | 0 01010000 | 00000101 | 01010000 | 0/— | 0/— |
| D17.2 | 0x051 | 0 01010001 | 01000101 | 01010001 | 0/— | 0/— |
| D18.2 | 0x052 | 0 01010010 | 11000101 | 01010011 | 1/FSV | 1/FSV |
| D19.2 | 0x053 | 0 01010011 | 11000101 | 01010011 | 0/— | 0/— |
| D20.2 | 0x054 | 0 01010100 | 00010101 | 01010100 | 0/— | 0/— |
| D21.2 | 0x055 | 0 01010101 | 01010101 | 01010101 | 0/— | 0/— |
| D22.2 | 0x056 | 0 01010110 | 10010101 | 01010110 | 0/— | 0/— |
| D23.2 | 0x057 | 0 01010111 | 11010101 | 01010111 | 0/— | 0/— |
| D24.2 | 0x058 | 0 01011000 | 01100101 | 01011001 | 1/FSV | 1/FSV |
| D25.2 | 0x059 | 0 01011001 | 01100101 | 01011001 | 0/— | 0/— |
| D26.2 | 0x05A | 0 01011010 | 10100101 | 01011010 | 0/— | 0/— |
| D27.2 | 0x05B | 0 01011011 | 11100101 | 01011011 | 0/— | 0/— |
| D28.2 | 0x05C | 0 01011100 | 00110101 | 01011100 | 0/— | 0/— |
| D29.2 | 0x05D | 0 01011101 | 01110101 | 01011101 | 0/— | 0/— |
| D30.2 | 0x05E | 0 01011110 | 10110101 | 01011110 | 0/— | 0/— |
| D31.2 | 0x05F | 0 01011111 | 11110101 | 01011111 | 0/— | 0/— |
| D0.3 | 0x060 | 0 01100000 | 00011001 | 01100100 | 1/FSV | 1/FSV |
| D1.3 | 0x061 | 0 01100001 | 01011001 | 01100101 | 1/FSV | 1/FSV |
| D2.3 | 0x062 | 0 01100010 | 10011001 | 01100110 | 1/FSV | 1/FSV |
| D3.3 | 0x063 | 0 01100011 | 11011001 | 01100111 | 1/FSV | 1/FSV |
| D4.3 | 0x064 | 0 01100100 | 00011001 | 01100100 | 0/— | 0/— |
| D5.3 | 0x065 | 0 01100101 | 01011001 | 01100101 | 0/— | 0/— |
| D6.3 | 0x066 | 0 01100110 | 10011001 | 01100110 | 0/— | 0/— |
| D7.3 | 0x067 | 0 01100111 | 11011001 | 01100111 | 0/— | 0/— |
| D8.3 | 0x068 | 0 01101000 | 01101001 | 01101001 | 1/FSV | 1/FSV |
| D9.3 | 0x069 | 0 01101001 | 01101001 | 01101001 | 0/— | 0/— |
| D10.3 | 0x06A | 0 01101010 | 10101001 | 01101010 | 0/— | 0/— |
| D11.3 | 0x06B | 0 01101011 | 11101001 | 01101011 | 0/— | 0/— |
| D12.3 | 0x06C | 0 01101100 | 00011001 | 01101100 | 0/— | 0/— |
| D13.3 | 0x06D | 0 01101101 | 01111001 | 01101101 | 0/— | 0/— |
| D14.3 | 0x06E | 0 01101110 | 10111001 | 01101110 | 0/— | 0/— |
| D15.3 | 0x06F | 0 01101111 | 11111001 | 01101111 | 0/— | 0/— |
| D16.3 | 0x070 | 0 01110000 | 00001101 | 01110000 | 0/— | 0/— |
| D17.3 | 0x071 | 0 01110001 | 01001101 | 01110001 | 0/— | 0/— |
| D18.3 | 0x072 | 0 01110010 | 11001101 | 01110011 | 1/FSV | 1/FSV |
| D19.3 | 0x073 | 0 01110011 | 11001101 | 01110011 | 0/— | 0/— |
| D20.3 | 0x074 | 0 01110100 | 00011101 | 01110100 | 0/— | 0/— |
| D21.3 | 0x075 | 0 01110101 | 01011101 | 01110101 | 0/— | 0/— |
| D22.3 | 0x076 | 0 01110110 | 10011101 | 01110110 | 0/— | 0/— |
| D23.3 | 0x077 | 0 01110111 | 11011101 | 01110111 | 0/— | 0/— |
| D24.3 | 0x078 | 0 01111000 | 01101101 | 01111001 | 1/FSV | 1/FSV |
| D25.3 | 0x079 | 0 01111001 | 01101101 | 01111001 | 0/— | 0/— |
| D26.3 | 0x07A | 0 01111010 | 10101101 | 01111010 | 0/— | 0/— |
| D27.3 | 0x07B | 0 01111011 | 11101101 | 01111011 | 0/— | 0/— |
| D28.3 | 0x07C | 0 01111100 | 00111101 | 01111100 | 0/— | 0/— |
| D29.3 | 0x07D | 0 01111101 | 01111101 | 01111101 | 0/— | 0/— |
| D30.3 | 0x07E | 0 01111110 | 10111101 | 01111110 | 0/— | 0/— |
| D31.3 | 0x07F | 0 01111111 | 11111101 | 01111111 | 0/— | 0/— |
| D0.4 | 0x080 | 0 10000000 | 00000001 | 01000000 | 1/FSV | 1/FSV |
| D1.4 | 0x081 | 0 10000001 | 01000001 | 01000001 | 1/FSV | 1/FSV |
| D2.4 | 0x082 | 0 10000010 | 10010101 | 01010110 | 1/FSV | 1/FSV |

TABLE 1-continued

Character Mapping Functions

| Character name | Hex value (c) | Binary value Z $b_7b_6b_5b_4b_3b_2b_1b_0$ | $FullMap_0(c)$ $b_7b_6b_5b_4b_3b_2b_1b_0$ | $FullMap_1(c)$ $b_7b_6b_5b_4b_3b_2b_1b_0$ | $MustMap_0(c)$/ reason | $MustMap_1(c)$/ reason |
|---|---|---|---|---|---|---|
| D3.4 | 0x083 | 0 10000011 | 11010101 | 01010111 | 1/FSV | 1/FSV |
| D4.4 | 0x084 | 0 10000100 | 00010001 | 01000100 | 1/FSV | 1/FSV |
| D5.4 | 0x085 | 0 10000101 | 01010001 | 01000101 | 1/FSV | 1/FSV |
| D6.4 | 0x086 | 0 10000110 | 10010001 | 01000110 | 1/FSV | 1/FSV |
| D7.4 | 0x087 | 0 10000111 | 11010001 | 01000111 | 1/FSV | 1/FSV |
| D8.4 | 0x088 | 0 10001000 | 10100101 | 01011010 | 1/FSV | 1/FSV |
| D9.4 | 0x089 | 0 10001001 | 01110101 | 01011101 | 1/FSV | 1/FSV |
| D10.4 | 0x08A | 0 10001010 | 10110101 | 01011110 | 1/FSV | 1/FSV |
| D11.4 | 0x08B | 0 10001011 | 11110101 | 01011111 | 1/FSV | 1/FSV |
| D12.4 | 0x08C | 0 10001100 | 00111001 | 01101100 | 1/FSV | 1/FSV |
| D13.4 | 0x08D | 0 10001101 | 01111001 | 01101101 | 1/FSV | 1/FSV |
| D14.4 | 0x08E | 0 10001110 | 10111001 | 01101110 | 1/FSV | 1/FSV |
| D15.4 | 0x08F | 0 10001111 | 11111001 | 01101111 | 1/FSV | 1/FSV |
| D16.4 | 0x090 | 0 10010000 | 00000110 | 10010000 | 1/FSV | 1/FSV |
| D17.4 | 0x091 | 0 10010001 | 01000110 | 10010001 | 1/FSV | 1/FSV |
| D18.4 | 0x092 | 0 10010010 | 00000101 | 01010000 | 1/FSV | 1/FSV |
| D19.4 | 0x093 | 0 10010011 | 11000110 | 10010011 | 1/FSV | 1/FSV |
| D20.4 | 0x094 | 0 10010100 | 00010110 | 10010100 | 1/FSV | 1/FSV |
| D21.4 | 0x095 | 0 10010101 | 01010110 | 10010101 | 1/FSV | 1/FSV |
| D22.4 | 0x096 | 0 10010110 | 10010110 | 10010110 | 1/FSV | 1/FSV |
| D23.4 | 0x097 | 0 10010111 | 11010110 | 10010111 | 1/FSV | 1/FSV |
| D24.4 | 0x098 | 0 10011000 | 01000101 | 01010001 | 1/FSV | 1/FSV |
| D25.4 | 0x099 | 0 10011001 | 01100110 | 10011001 | 1/FSV | 1/FSV |
| D26.4 | 0x09A | 0 10011010 | 10100110 | 10011010 | 1/FSV | 1/FSV |
| D27.4 | 0x09B | 0 10011011 | 11100110 | 10011011 | 1/FSV | 1/FSV |
| D28.4 | 0x09C | 0 10011100 | 00110110 | 10011100 | 1/FSV | 1/FSV |
| D29.4 | 0x09D | 0 10011101 | 01110110 | 10011101 | 1/FSV | 1/FSV |
| D30.4 | 0x09E | 0 10011110 | 10110110 | 10011110 | 1/FSV | 1/FSV |
| D31.4 | 0x09F | 0 10011111 | 11110110 | 10011111 | 1/FSV | 1/FSV |
| D0.5 | 0x0A0 | 0 10100000 | 00011101 | 01110100 | 1/FSV | 1/FSV |
| D1.5 | 0x0A1 | 0 10100001 | 01011101 | 01110101 | 1/FSV | 1/FSV |
| D2.5 | 0x0A2 | 0 10100010 | 10011101 | 01110110 | 1/FSV | 1/FSV |
| D3.5 | 0x0A3 | 0 10100011 | 11011101 | 01110111 | 1/FSV | 1/FSV |
| D4.5 | 0x0A4 | 0 10100100 | 00011010 | 10100100 | 1/FSV | 1/FSV |
| D5.5 | 0x0A5 | 0 10100101 | 01011010 | 10100101 | 1/FSV | 1/FSV |
| D6.5 | 0x0A6 | 0 10100110 | 10011010 | 10100110 | 1/FSV | 1/FSV |
| D7.5 | 0x0A7 | 0 10100111 | 11011010 | 10100111 | 1/FSV | 1/FSV |
| D8.5 | 0x0A8 | 0 10101000 | 10101101 | 01111010 | 1/FC, FSV | 1/FC, FSV |
| D9.5 | 0x0A9 | 0 10101001 | 11101101 | 01111011 | 1/FC, FSV | 1/FC, FSV |
| D10.5 | 0x0AA | 0 10101010 | 10101010 | 01101010 | 1/FC, FSV | 1/FC, FSV |
| D11.5 | 0x0AB | 0 10101011 | 11101001 | 01101011 | 1/FC, FSV | 1/FC, FSV |
| D12.5 | 0x0AC | 0 10101100 | 00111010 | 10101100 | 1/FSV | 1/FSV |
| D13.5 | 0x0AD | 0 10101101 | 01111010 | 10101101 | 1/FSV | 1/FSV |
| D14.5 | 0x0AE | 0 10101110 | 10111010 | 10101110 | 1/FSV | 1/FSV |
| D15.5 | 0x0AF | 0 10101111 | 11111010 | 10101111 | 1/FSV | 1/FSV |
| D16.5 | 0x0B0 | 0 10110000 | 00001110 | 10110000 | 1/FSV | 1/FSV |
| D17.5 | 0x0B1 | 0 10110001 | 01001110 | 10110001 | 1/FSV | 1/FSV |
| D18.5 | 0x0B2 | 0 10110010 | 00001101 | 01110000 | 1/FSV | 1/FSV |
| D19.5 | 0x0B3 | 0 10110011 | 11001110 | 10110011 | 1/FSV | 1/FSV |
| D20.5 | 0x0B4 | 0 10110100 | 00011110 | 10110100 | 1/FSV | 1/FSV |
| D21.5 | 0x0B5 | 0 10110101 | 01011110 | 10110101 | 1/FSV | 1/FSV |
| D22.5 | 0x0B6 | 0 10110110 | 10011110 | 10110110 | 1/FSV | 1/FSV |
| D23.5 | 0x0B7 | 0 10110111 | 11011110 | 10110111 | 1/FSV | 1/FSV |
| D24.5 | 0x0B8 | 0 10111000 | 01001101 | 01110001 | 1/FSV | 1/FSV |
| D25.5 | 0x0B9 | 0 10111001 | 01101110 | 10111001 | 1/FSV | 1/FSV |
| D26.5 | 0x0BA | 0 10111010 | 10101110 | 10111010 | 1/FSV | 1/FSV |
| D27.5 | 0x0BB | 0 10111011 | 11101110 | 10111011 | 1/FSV | 1/FSV |
| D28.5 | 0x0BC | 0 10111100 | 00111110 | 10111100 | 1/FSV | 1/FSV |
| D29.5 | 0x0BD | 0 10111101 | 01111110 | 10111101 | 1/FSV | 1/FSV |
| D30.5 | 0x0BE | 0 10111110 | 10111110 | 10111110 | 1/FSV | 1/FSV |
| D31.5 | 0x0BF | 0 10111111 | 11111111 | 10111111 | 1/FSV | 1/FSV |
| D0.6 | 0x0C0 | 0 11000000 | 00000011 | 11000000 | 0/— | 0/— |
| D1.6 | 0x0C1 | 0 11000001 | 01000011 | 11000001 | 0/— | 0/— |
| D2.6 | 0x0C2 | 0 11000010 | 11000011 | 11000011 | 1/FSV | 1/FSV |
| D3.6 | 0x0C3 | 0 11000011 | 11000011 | 11000011 | 0/— | 0/— |
| D4.6 | 0x0C4 | 0 11000100 | 00010011 | 11000100 | 0/— | 0/— |
| D5.6 | 0x0C5 | 0 11000101 | 01010011 | 11000101 | 0/— | 0/— |
| D6.6 | 0x0C6 | 0 11000110 | 10010011 | 11000110 | 0/— | 0/— |
| D7.6 | 0x0C7 | 0 11000111 | 11010011 | 11000111 | 0/— | 0/— |
| D8.6 | 0x0C8 | 0 11001000 | 00110011 | 11001100 | 1/FSV | 1/FSV |
| D9.6 | 0x0C9 | 0 11001001 | 01110011 | 11001101 | 1/FSV | 1/FSV |
| D10.6 | 0x0CA | 0 11001010 | 10110011 | 11001110 | 1/FSV | 1/FSV |
| D11.6 | 0x0CB | 0 11001011 | 11110011 | 11001111 | 1/FSV | 1/FSV |
| D12.6 | 0x0CC | 0 11001100 | 00110011 | 11001100 | 0/— | 0/— |

TABLE 1-continued

Character Mapping Functions

| Character name | Hex value (c) | Binary value Z $b_7b_6b_5b_4b_3b_2b_1b_0$ | FullMap$_0$(c) $b_7b_6b_5b_4b_3b_2b_1b_0$ | FullMap$_1$(c) $b_7b_6b_5b_4b_3b_2b_1b_0$ | MustMap$_0$(c)/ reason | MustMap$_1$(c)/ reason |
|---|---|---|---|---|---|---|
| D13.6 | 0x0CD | 0 11001101 | 01110011 | 11001101 | 0/— | 0/— |
| D14.6 | 0x0CE | 0 11001110 | 10110011 | 11001110 | 0/— | 0/— |
| D15.6 | 0x0CF | 0 11001111 | 11110011 | 11001111 | 0/— | 0/— |
| D16.6 | 0x0D0 | 0 11010000 | 00000111 | 11010000 | 0/— | 0/— |
| D17.6 | 0x0D1 | 0 11010001 | 01000111 | 11010001 | 0/— | 0/— |
| D18.6 | 0x0D2 | 0 11010010 | 11000111 | 11010011 | 1/FSV | 1/FSV |
| D19.6 | 0x0D3 | 0 11010011 | 11000111 | 11010011 | 0/— | 0/— |
| D20.6 | 0x0D4 | 0 11010100 | 00010111 | 11010100 | 0/— | 0/— |
| D21.6 | 0x0D5 | 0 11010101 | 01010111 | 11010101 | 0/— | 0/— |
| D22.6 | 0x0D6 | 0 11010110 | 10010111 | 11010110 | 0/— | 0/— |
| D23.6 | 0x0D7 | 0 11010111 | 11010111 | 11010111 | 0/— | 0/— |
| D24.6 | 0x0D8 | 0 11011000 | 01100111 | 11011001 | 1/FSV | 1/FSV |
| D25.6 | 0x0D9 | 0 11011001 | 01100111 | 11011001 | 0/— | 0/— |
| D26.6 | 0x0DA | 0 11011010 | 10100111 | 11011010 | 0/— | 0/— |
| D27.6 | 0x0DB | 0 11011011 | 11100111 | 11011011 | 0/— | 0/— |
| D28.6 | 0x0DC | 0 11011100 | 00110111 | 11011100 | 0/— | 0/— |
| D29.6 | 0x0DD | 0 11011101 | 01110111 | 11011101 | 0/— | 0/— |
| D30.6 | 0x0DE | 0 11011110 | 10110111 | 11011110 | 0/— | 0/— |
| D31.6 | 0x0DF | 0 11011111 | 11110111 | 11011111 | 0/— | 0/— |
| D0.7 | 0x0E0 | 0 11100000 | 00011011 | 11100100 | 1/FSV | 1/FSV |
| D1.7 | 0x0E1 | 0 11100001 | 01011011 | 11100101 | 1/FSV | 1/FSV |
| D2.7 | 0x0E2 | 0 11100010 | 10011011 | 11100110 | 1/FSV | 1/FSV |
| D3.7 | 0x0E3 | 0 11100011 | 11011011 | 11100111 | 1/FSV | 1/FSV |
| D4.7 | 0x0E4 | 0 11100100 | 00011011 | 11100100 | 0/— | 0/— |
| D5.7 | 0x0E5 | 0 11100101 | 01011011 | 11100101 | 0/— | 0/— |
| D6.7 | 0x0E6 | 0 11100110 | 10011011 | 11100110 | 0/— | 0/— |
| D7.7 | 0x0E7 | 0 11100111 | 11011011 | 11100111 | 0/— | 0/— |
| D8.7 | 0x0E8 | 0 11101000 | 01101011 | 11101001 | 1/FSV | 1/FSV |
| D9.7 | 0x0E9 | 0 11101001 | 01101011 | 11101001 | 0/— | 0/— |
| D10.7 | 0x0EA | 0 11101010 | 10101011 | 11101010 | 0/— | 0/— |
| D11.7 | 0x0EB | 0 11101011 | 11101011 | 11101011 | 0/— | 0/— |
| D12.7 | 0x0EC | 0 11101100 | 00111011 | 11101100 | 0/— | 0/— |
| D13.7 | 0x0ED | 0 11101101 | 01111011 | 11101101 | 0/— | 0/— |
| D14.7 | 0x0EE | 0 11101110 | 10111011 | 11101110 | 0/— | 0/— |
| D15.7 | 0x0EF | 0 11101111 | 11111011 | 11101111 | 0/— | 0/— |
| D16.7 | 0x0F0 | 0 11110000 | 00001111 | 11110000 | 0/— | 0/— |
| D17.7 | 0x0F1 | 0 11110001 | 01001111 | 11110001 | 0/— | 0/— |
| D18.7 | 0x0F2 | 0 11110010 | 11001111 | 11110011 | 1/FSV | 1/FSV |
| D19.7 | 0x0F3 | 0 11110011 | 11001111 | 11110011 | 0/— | 0/— |
| D20.7 | 0x0F4 | 0 11110100 | 00011111 | 11110100 | 0/— | 0/— |
| D21.7 | 0x0F5 | 0 11110101 | 01011111 | 11110101 | 0/— | 0/— |
| D22.7 | 0x0F6 | 0 11110110 | 10011111 | 11110110 | 0/— | 0/— |
| D23.7 | 0x0F7 | 0 11110111 | 11011111 | 11110111 | 0/— | 0/— |
| D24.7 | 0x0F8 | 0 11111000 | 01101111 | 11111001 | 1/FSV | 1/FSV |
| D25.7 | 0x0F9 | 0 11111001 | 01101111 | 11111001 | 0/— | 0/— |
| D26.7 | 0x0FA | 0 11111010 | 10101111 | 11111010 | 0/— | 0/— |
| D27.7 | 0x0FB | 0 11111011 | 11101111 | 11111011 | 0/— | 0/— |
| D28.7 | 0x0FC | 0 11111100 | 00111111 | 11111100 | 0/— | 0/— |
| D29.7 | 0x0FD | 0 11111101 | 01111111 | 11111101 | 0/— | 0/— |
| D30.7 | 0x0FE | 0 11111110 | 10111111 | 11111110 | 0/— | 0/— |
| D31.7 | 0x0FF | 0 11111111 | 11111111 | 11111111 | 0/— | 0/— |
| K28.0 | 0x11C | 1 00011100 | 01111101 | 01111101 | 1/CC | 1/CC |
| K28.1 | 0x13C | 1 00111100 | 10111101 | 01111110 | 1/CC | 1/CC |
| K28.2 | 0x15C | 1 01011100 | 00110101 | 01011100 | 1/CC | 1/CC |
| K28.3 | 0x17C | 1 01111100 | 00111101 | 01111100 | 1/CC | 1/CC |
| K28.4 | 0x19C | 1 10011100 | 00010101 | 01010100 | 1/CC | 1/CC |
| K28.5 | 0x1BC | 1 10111100 | 00000000 | 10101010 | 1/CC | 1/CC |
| K28.6 | 0x1DC | 1 11011100 | 00110111 | 11011100 | 1/CC | 1/CC |
| K28.7 | 0x1FC | 1 11111100 | 00111111 | 11111100 | 1/CC | 1/CC |
| K23.7 | 0x1F7 | 1 11110111 | 11011111 | 11110111 | 1/CC | 1/CC |
| K27.7 | 0x1FB | 1 11111011 | 11101111 | 11111011 | 1/CC | 1/CC |
| K29.7 | 0x1FD | 1 11111101 | 01111111 | 11111101 | 1/CC | 1/CC |
| K30.7 | 0x1FE | 1 11111110 | 10111111 | 11111110 | 1/CC | 1/CC |
| K0.7 | 0x1E0 | 1 11100000 | 10101111 | 11111010 | 1/XC | 1/XC |

FSV: Full-Swing Violation
FC: False Comma
CC: Control Character
XC: Exception Character, only recognized by encoder (decoder signals error on a codeword containing this character, but otherwise decodes the codeword correctly)

The requirements discussed previously dictate some of the mappings (e.g. the commas), and rule out some others (e.g. false comma prevention). The remaining mappings are designed to be simple to implement in digital logic, i.e., to minimize the logic equations necessary to describe the mapping, and the implementation is understood by persons of ordinary skill in the art in light of the present teachings.

As can be seen from Table 1, $FullMap_0(c)=Reverse(FullMap_1(c))$, where the function Reverse( ) is defined previously for the general case, with the following exception:

$FullMap_0(K28.5)=00000000$, whereas $FullMap_1(K28.5)=10101010$

The difference is due to the different mappings of the comma character that are needed to distinguish between a comma in the low and high parts of a codeword.

It is preferable for the 16b/10s coding scheme to have a sufficiently high transition density to allow reliable clock data recovery (CDR) at the receiver. This requirement has previously been described in general terms. Now that the outline of the coding scheme is in place, an exact definition can be made, in a preferred implementation of a fourth embodiment of the present invention:

There are at least one of the six valid CDR-transitions 00/01, 01/11 or 11/10 within the 20 bits of a codeword.

Given this definition, the codewords resulting from the mapping defined above can be analyzed. The result is that 294 out of the 72,361 codewords violate the CDR-requirements. A more detailed analysis performed by the inventor shows that the 294 problematic symbols are made up of all combinations of 21 special $C_0$-characters and 14 special $C_1$-characters that each has no valid CDR-transitions after being mapped. When these characters are combined, the resulting codewords will have no CDR-transitions either. Table 2 and Table 3 below show the offending characters.

TABLE 3

$C_1$-characters without CDR-transitions after Mapping

| Character name | Hex value (c) | Binary value Z $b_7b_6b_5b_4b_3b_2b_1b_0$ | Maps to $b_7b_6b_5b_4b_3b_2b_1b_0$ (=$ReMap_1^{-1}(c')$) | c' = $ReMap_1(c)$ $b_3b_2b_1b_0$ |
|---|---|---|---|---|
| D24.2 | 0x058 | 0 01011000 | 01011001 | 0001 |
| D1.3 | 0x061 | 0 01100001 | 01100101 | 0011 |
| D2.3 | 0x062 | 0 01100010 | 01100110 | 0100 |
| D8.3 | 0x068 | 0 01101000 | 01101001 | 0101 |
| D2.4 | 0x082 | 0 10000010 | 01010110 | 0110 |
| D8.4 | 0x088 | 0 10001000 | 01011000 | 0111 |
| D21.4 | 0x095 | 0 10010101 | 10010101 | 1001 |
| D22.4 | 0x096 | 0 10010110 | 10010110 | 1010 |
| D25.4 | 0x099 | 0 10011001 | 10011001 | 1011 |
| D26.4 | 0x09A | 0 10011010 | 10011010 | 1100 |
| D5.5 | 0x0A5 | 0 10100101 | 10100101 | 1101 |
| D6.5 | 0x0A6 | 0 10100110 | 10100110 | 1110 |
| D10.5 | 0x0AA | 0 10101010 | 01101010 | 1111 |
| K28.5 | 0x1BC | 1 10111100 | 10101010 | N/A |

Also, one of ordinary skill in the art will recognize that a different definition than the one given above with respect to CDR may be utilized for a 16b/10s scheme according to a fourth embodiment of the present invention, without departing from the spirit and scope of the present invention. For example, a scheme that requires at least two one-step transitions in a single 20-bit codeword can alternatively be utilized to guarantee CDR at the receiver.

The inventor has determined that the 16b/10s code space does not contain sufficient mapping options that the CDR-transition issue can be solved by using different mappings for the offending characters altogether. A further complication is that one of the 14 special $C_1$-characters is K28.5, the comma, meaning that the selection of the bit pattern for bits 9–0 is very limited.

Consequently, to eliminate these few codewords that violate the desired CDR-transition property, two additional

TABLE 2

$C_0$-characters without CDR-transitions after Mapping

| Character name | Hex value (c) | Binary value Z $b_7b_6b_5b_4b_3b_2b_1b_0$ | Maps to $b_7b_6b_5b_4b_3b_2b_1b_0$ / $m_1m_1$ (=$ReMap_0^{-1}(c')$) | c' = $ReMap_0(c)$ $b_5b_4b_3b_2b_1b_0$ |
|---|---|---|---|---|
| D21.2 | 0x055 | 0 01010101 | 01010101 / 01 | 0001 11 |
| D22.2 | 0x056 | 0 01010110 | 10010101 / 01 | 0011 11 |
| D24.2 | 0x058 | 0 01011000 | 01100101 / 10 | 0001 01 |
| D25.2 | 0x059 | 0 01011001 | 01100101 / 01 | 0100 11 |
| D26.2 | 0x05A | 0 01011010 | 10100101 / 01 | 0011 01 |
| D1.3 | 0x061 | 0 01100001 | 01011001 / 01 | 0100 01 |
| D2.3 | 0x062 | 0 01100010 | 10011001 / 10 | 0111 01 |
| D5.3 | 0x065 | 0 01100101 | 01011001 / 01 | 0101 11 |
| D6.3 | 0x066 | 0 01100110 | 10011001 / 01 | 0110 11 |
| D8.3 | 0x068 | 0 01101000 | 01101001 / 10 | 1011 01 |
| D9.3 | 0x069 | 0 01101001 | 01101001 / 01 | 0111 11 |
| D10.3 | 0x06A | 0 01101010 | 10101001 / 01 | 1001 11 |
| D2.4 | 0x082 | 0 10000010 | 10010101 / 10 | 1100 01 |
| D8.4 | 0x088 | 0 10001000 | 10100101 / 10 | 1101 01 |
| D21.4 | 0x095 | 0 10010101 | 01010110 / 01 | 1010 11 |
| D22.4 | 0x096 | 0 10010110 | 10010110 / 01 | 1011 11 |
| D25.4 | 0x099 | 0 10011001 | 01100110 / 01 | 1100 11 |
| D26.4 | 0x09A | 0 10011010 | 10100110 / 01 | 1101 01 |
| D5.5 | 0x0A5 | 0 10100101 | 01011010 / 01 | 1110 11 |
| D6.5 | 0x0A6 | 0 10100110 | 10011010 / 01 | 1111 11 |
| D10.5 | 0x0AA | 0 10101010 | 10101001 / 10 | 1110 01 | remapping functions are introduced as described in the following algorithm, in accordance with a fifth embodiment of the present invention:

a) Define the function $Special_0(c)$ to be 1 if c is one of the $C_0$-characters in Table 2 and 0 otherwise. Similarly define the function $Special_1(c)$ to be 1 if c is one of the $C_1$-characters in Table 3 except K28.5, and 0 otherwise.

b) If $Special_0(C_0)==1$ and $C==K28.5$, the original codeword is of the form:
{01, $C_0$', mm, 10101010} c) The remapped codeword is defined by:
{01, $ReMap_0(C_0)$, 1010, 10101010}, where $ReMap_0(\ )$ is defined in Table 2 and has been chosen to guarantee a CDR-transition. These codewords maintain the comma properties and are easily distinguishable from all other codewords because of the pattern in bits 9–0.

If $Special_0(C_0)==1$ and $Special_1(C_1)=1$, the original codeword is of the form:
{01, $C_0$', mm, $C_1$'}

The remapped codeword is defined as:
{01, $C_0$', 0100, $ReMap_M(mm)$, $ReMap_1(C_1)$}, where $ReMap_0(\ )$ is defined in Table 2 and $ReMap_M(\ )$ is defined as:
$ReMap_M(01)=01$ and $ReMap_M(10)=11$ Values of mm other than 01 and 10 does not occur within this type of codewords.

These codewords are also easily distinguishable from all other codewords because of the 0100 pattern in bits 9–6 that doesn't occur in other codewords unless $C_0==K28.5$, and this case is easily distinguishable.

Based on the above analysis, the full 16b/10s encoding algorithm according to a preferred implementation of the fifth embodiment can be summarized as follows:

1. Define the functions $MustMap_0(\ )$, $MustMap_1(\ )$, $FullMap_0(\ )$ and $FullMap_1(\ )$ as discussed with reference to the general case, and the functions $Special_0(\ )$, $Special_1(\ )$, $ReMap_0(\ )$, $ReMap_1(\ )$ and $ReMap_M(\ )$ as discussed previously.
2. Given two characters $C_0$ and $C_1$, let:
   a. $M_0=MustMap_0(C_0)$
   b. $M_1=MustMap_1(C_1)$
   c. $C_0'=FullMap_0(C_0)$
   d. $C_1'=FullMap_1(C_1)$
3. Determine the intermediate mapping selector M':
   a. If $C_0==K28.5$ and $C_1==K28.5$, M'=01
   b. Else if $C_0==K28.5$, M'={$^-M_1$, 1}
   c. Else M'={$M_0$, $M_0$ ^ $M_1$}
4. Let C'={01, $C_0$', M', $C_1$'} be an intermediate codeword
5. Determine another intermediate mapping selector M:
   a. If C' is one of xx xxxx0000 00 00xxxxxx, xx xxxxxx00 00 0000xxxx, xx xxxx1010 10 10xxxxxx or xx xxxxxx10 10 1010xxxx, let M=01
   b. Else M=M'
6. If $Special_0(C_0)=0$, let C {01, $C_0$', M, $C_1$'}. Else perform the following actions:
   a. If $C_1==K28.5$, C={01, $ReMap_0(C_0)$, 1010, $C_1$'}
   b. Else if $Special_1(C_1)==1$, C={01, $C_0$', 0100, $ReMap_M(M)$, $ReMap_1(C_1)$}
7. Now C is the final mapped codeword (before DC-balancing)
8. Determine the final codeword $C_{Final}$ after applying the DC-balancing algorithm:
   a. Let Disp=disparity of C, and let CurDisp=current disparity
   b. If $Disp>_0$ and CurDisp>0, or Disp<0 and CurDisp<0:
      1. Disp=–Disp
      2. $CF_{Final}=C\hat{\ }10101010101010101010$
   c. Else $C_{Final}=C$
   d. The new current disparity is equal to CurDisp+Disp The 16b/10s decoding algorithm according to a sixth embodiment can be deduced by performing the inverse steps of the encoding algorithm of the fifth embodiment in reverse order. The decoding algorithm is summarized below:

1. Given a received codeword C, perform removal of DC-balancing:
   a. If C[19]=1, C'=C ^ 10 10101010 10 10101010
   b. Else C'=C
2. Define the functions $ReMap_0^{-1}(\ )$ and $ReMap_1^{-1}(\ )$ as discussed in Table 2 and Table 3, respectively, and further define the functions ReMapped( ) and $ReMap_M^{-1}(\ )$ as follows:
   a. $ReMapped_0(c')==1$ if c' is one of the mappings $b_7$–$b_0$ in the $ReMap_0^{-1}(\ )$ column in Table 2), and 0 otherwise
   b. $ReMap_M^{-1}(01)=01$ and $ReMap_M^{-1}(11)=10$, undefined otherwise
3. Perform inverse re-mapping, if applicable:
   a. If C'[11:0]==10 10 10101010, C"={C'[19:18], $ReMap_0^{-1}(C'[17:12])$, C'[7:0]}
   b. Else if C'[9:6]=0100 and $ReMapped_0(C'[17:12])==1$, C"={C'[19:10], $ReMap_M^{-1}(C'[5:4])$, $ReMap_1^{-1}(C'[3:0])$}
   c. Else C"=C'
4. Determine the basic mapping characteristics:
   a. $M_0$=C"[9]
   b. $M_1$=C"[9] ^ C"[8]
5. Modify the mapping characteristics to compensate for eliminated false commas:
   a. If C"[11:4]==000100000 or C"[13:6]=00000100, $M_1$'=0,
   b. Else $M_1$'=$M_1$
   c. If C"[11:4] 10011010 or C"[13:6]=10100110, $M_0$'=1
   d. Else $M_0$'=$M_0$
6. Define the functions $FullMap_0^{-1}(\ )$ and $FullMap_1^{-1}(\ )$ as follows:
   a. c=$FullMap_0^{-1}(ch, m)$, where $FullMap_0(c)$=ch and $MustMap_0(c)==m$. This is the inverse mapping of $FullMap_0(\ )$ from Table 1, taking $MustMap_0(\ )$ into account.
   b. c=$FullMap_1^{-1}(ch, m)$, where $FullMap_1(c)$=ch and $MustMap_1(c)==m$. This is the inverse mapping of $FullMap_1(\ )$ from Table 1, taking $MustMap_1(\ )$ into account.
7. Perform the actual character decoding:
   a. $C_0=FullMap_0^{-1}(C"[17:10])$
   b. $C_1=FullMap_0^{-1}(C"[7:0])$
8. Independent of the character decoding, erroneous codewords are detected if any of the following conditions are true:
   a. C'[19:18] !=01 (codeword must start with 01)
   b. In an attempt to perform the inverse remapping, any of the functions $ReMap_0^{-1}(\ )$, $ReMap_1^{-1}(\ )$ or $ReMap_M^{-1}(\ )$ are used on data for which the function result is not defined.
   c. $FullMap_0^{-1}(C"[17:10], M_0")$ is not defined, according to Table 1.

d. FullMap$_1^{-1}$(C"[7:0], M$_1$") is not defined, according to Table 1.

If an error is detected in a codeword, both of the decoded characters are considered to be erroneous. There is no error detection at the character level.

The 16b/10s decoding algorithm does not care about disparity issues, as opposed to e.g., the 8b/10b decoder. This is because the 16b/10s coding scheme is more complex, and it is very difficult for the receiver to predict the disparity of a codeword in all cases.

The weight distribution for the 16b/10s coding scheme, including the DC-balancing function, is shown in FIG. 8. This is an optimal weight distribution, with the majority of the codewords being of a fairly low weight.

Because of the DC-balancing algorithm that can invert the sign of all codewords, the weight distribution is completely symmetric. The maximum codeword weights are +24 and −24 and according to the DC-balancing algorithm described previously, the worst-case current disparity (DC-imbalance) that can occur is thus +24 and −24.

Figure 9:
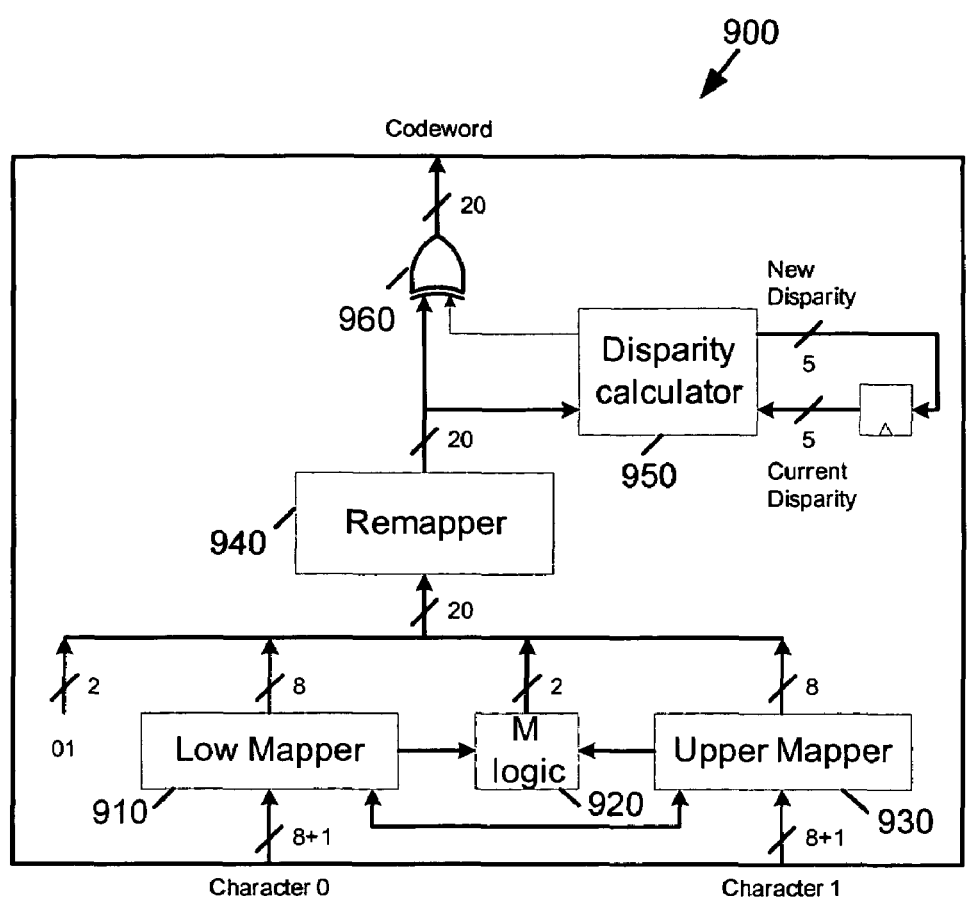
FIG. 9 shows an encoder architecture according to a seventh embodiment of the invention.

FIG. 9 shows the architecture of an implementation of the 16b/10s encoder, according to a seventh embodiment of the present invention. The 16b/10s encoder 900 includes a Low Mapper Unit 910, an M Logic Unit 920, an Upper Mapper Unit 930, a Remapper 940, a Disparity Calculator 950, and a XOR Unit 960, whereby the output of the XOR Unit 960 corresponds to the 20 bit (10 symbols) codeword. An 8+1 bit Character 0 (the 1-bit signifies whether it is control information or data) is input to the Low Mapper Unit 910, and 8+1 bit Character 1 is input to the Upper Mapper Unit 930. Because the character encoding function only depends on the input characters, the encoder 900 can be pipelined between the character encoding function and the DC-balancing/disparity calculator function, if needed to achieve the required operating frequency.

In an alternate configuration, the 16b/10s coding scheme can be used in a 4-character wide data path simply by using two 16b/10s encoders in parallel. In this scenario, because the disparity is calculated independently for each 20-bit data path, the maximum disparity imbalance is doubled.

Figure 10:
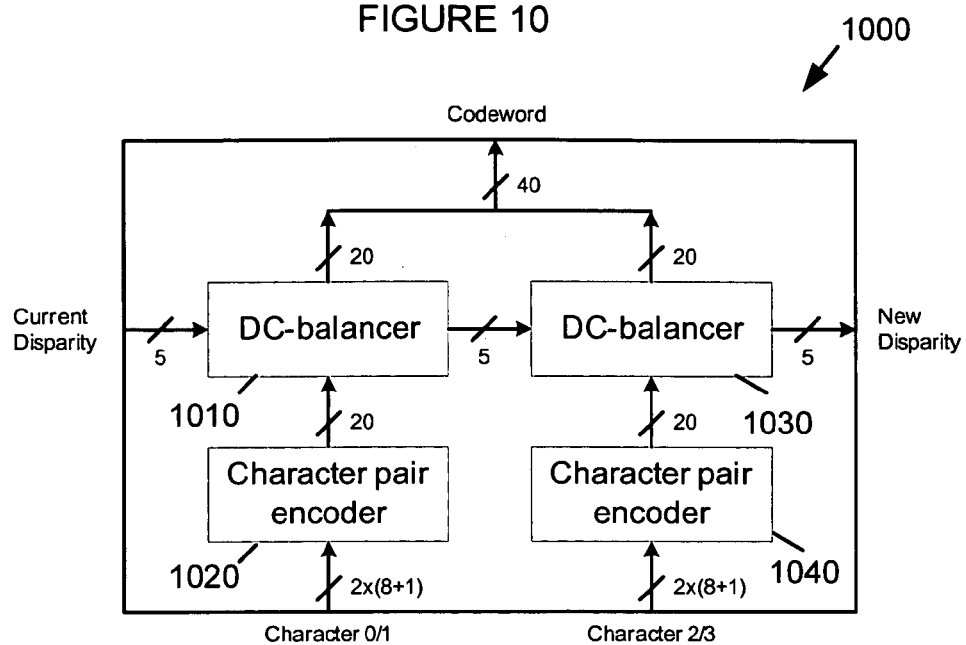
FIG. 10 shows an encoder architecture according to an eighth embodiment of the invention.

Alternatively, in an eight embodiment of the present invention, the disparity calculation and DC-balancing can be cascaded between the two 16b/10s encoders as shown in FIG. 10, but this will likely impact the timing of the circuit. In the encoding system 1000 as shown in FIG. 10, a first DC-balancer 1010 receives output codewords from a first character pair encoder 1020, and a second DC-balancer 1030 receives output codewords from a second character pair encoder 1040. A current disparity is input to the first DC-balancer 1010, which provides an updated current disparity (based on the disparity of the codeword output by the first character pair encoder 1020) to the second DC-balancer 1030, whereby the second DC-balancer 1030 computes a new disparity based on the disparity of the codeword output by the second character pair encoder 1020. The output of the second DC-balancer 1030 is then provided, as the current disparity, for the next set of codewords output by the system shown in FIG. 10.

In an alternate configuration to the one shown in FIG. 10, only one DC-balancer may be utilized to compute the new disparity for the first and second character pair encoders 1020, 1040.

In the configuration shown in FIG. 10, a further increase in speed can also be achieved by pipelining between the character encoders and the DC-balancers, if required.

Figure 11:
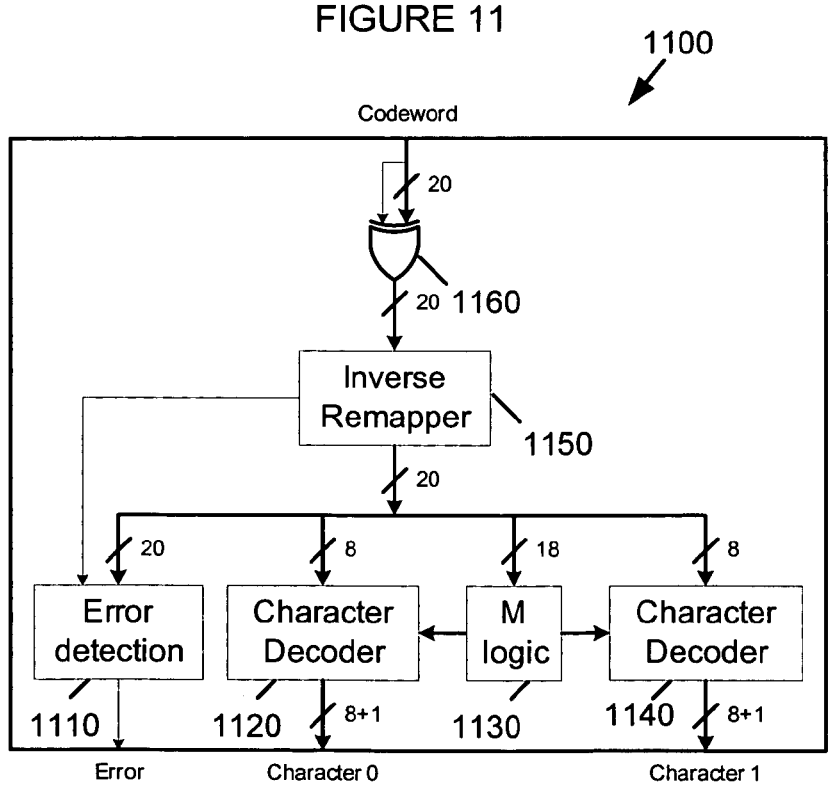
FIG. 11 shows a decoder architecture according to a ninth embodiment of the invention.

FIG. 11 shows the architecture of an implementation of the 16b/10s decoder, according to a ninth embodiment of the present invention. In FIG. 11, the 16b/10s Decoder 1100 includes an Error Detection Unit 1110, a first Character Decoder 1120, a M Logic Unit 1130, a second Character Decoder 1140, an Inverse Remapper 1150, and an XOR Unit 1160. 10 adjacent 2-bit symbols, received from a signal transmission line, are input to the XOR Unit 1160, and an inverse mapping operation is performed on those symbols, by way of the Inverse Remapper 1150. The output of the Inverse Remapper 1150 is provided, in parallel, to the Error Detection Unit 1110, the first Character Decoder 1120, the M Logic Unit 1130, the second Character Decoder 1140. The Error Detection Unit 1110 outputs an error signal (in a manner known to those skilled in the art, it can be utilized for error correction and detection techniques), the first Character Decoder 1120 outputs a first character 0, and the second Character Decoder 1140 outputs a second character 1. The M Logic Unit 1130 decodes the M field, and provides information to both the first Character Decoder 1120 and the second Character Decoder 1140, for their respective decoding operations. In a preferred implementation of the ninth embodiment, the XOR Unit 1160 corresponds to a set of (10) parallel XOR gates, applied to every other of the bits in the 20 bit codeword.

It is possible to introduce pipelining in both the character decoders and the error detection logic, but this is unlikely to be needed as the logic turns out to be relatively simple. Furthermore, the decoder used in accordance with the present invention can be extended to a wider data path just by having multiple 16b/10s decoders operating completely independently in parallel, independently of whether the encoders operate independently or cascaded, as described previously.

Thus, apparatuses and methods has been described according to the present invention. Many modifications and variations may be made to the techniques and structures described and illustrated herein without departing from the spirit and scope of the invention. For example, while the different embodiments have been described with respect to PAM-4, other types of multi-level signaling for sending and receiving serial data over serial links, may be envisioned, such as PAM-8, 16, . . . , QAM-8, QAM-16, etc., may be envisioned, while remaining within the spirit and scope of the present invention. Accordingly, it should be understood that the methods and apparatus described herein are illustrative only and are not limiting upon the scope of the invention. Further, one or more aspects as described can be combined in any given system or method. Still further, one or more embodiments may be implemented in hardware, e.g., by a schematic design or a hardware description language (HDL), and/or implemented in a programmable logic device (FPGA/CPLD) or an ASIC, and/or they can be implemented in hardware using discrete hardware devices. Alternatively, one or more embodiments may be implemented in software, such as by using a table-driven lookup mechanism for efficiency.

What is claimed is:

1. A method of transmitting digital signals in a multi-level signaling system wherein digital signals representing more than one bit of information may be transmitted at more than two signal levels on a single transmission medium, the method comprising the steps of:

encoding digital values represented by two consecutive N-bit characters into an R-bit codeword, wherein the R-bit codeword is configured so as to reduce full swings, each of the N-bit characters being designated as either data or control information based on a Q-bit tag associated with each of the N-bit characters; and transmitting the R-bit codeword as a plurality of PAM-L symbols on the single transmission medium, wherein L, N, R and Q are positive integer values, and wherein the R-bit codeword includes a first field that corresponds to a first of the two consecutive N-bit characters and its associated Q-bit tag, a second field that corresponds to a second of the two consecutive N-bit characters and its associated Q-bit tag, and a third field provided between the first and second fields that is a function of the two consecutive N-bit characters and their associated Q-bit tags.

2. The method according to claim 1, wherein the encoding step is performed without regard to DC-balancing, the method further comprising:

determining if the R-bit codeword should be modified to provide DC-balancing, without affecting full swing elimination; and if it is determined that the R-bit codeword should be modified to provide DC-balancing, modifying the R-bit codeword to another R-bit codeword of an opposite polarity weight as the R-bit codeword.

3. The method according to claim 1, wherein the encoding step comprises:

mapping at least one of the two consecutive N-bit characters into a different bit pattern, for the purpose of eliminating full swings in the R-bit codeword.

4. The method according to claim 1, wherein the encoding is performed on each of the two consecutive N-bit characters independent of each other.

5. The method according to claim 1, wherein the encoding is performed on each of the two consecutive N-bit characters in parallel to each other.

6. The method according to claim 1, wherein the encoding that is performed on each of the two consecutive N-bit characters is substantially the same.

7. The method according to claim 6, wherein the encoding that is performed on one of the two consecutive N-bit characters differs from the encoding that is performed on the other of the two consecutive N-bit characters due to a different arrangement of encoded bits.

8. The method according to claim 1, wherein the third field in the R-bit codeword is a bit string that is set to a particular bit string value based on whether the first, the second, both or none of the two consecutive N-bit characters are mapped into a different bit pattern, wherein the third field in the R-bit codeword is provided so as to ensure that no full-swing violation occur at beginning and ending boundaries of the third field.

9. The method according to claim 1, further comprising:

transmitting each R-bit codeword as a plurality of sets of symbols over the single transmission medium.

10. The method according to claim 1, wherein the encoding step comprises:

determining a current disparity on the single transmission medium; and assigning each R-bit codeword to one codeword out of a pair of codewords having a same weight but a different polarity with respect to each other, such that the current disparity becomes closer to zero, thereby achieving DC balancing on the single transmission medium as a result.

11. The method according to claim 1, wherein the encoding step comprises:

determining whether a comma is to be provided in the R-bit codeword, and if so, performing codeword mapping to include one of a plurality of predetermined comma patterns in either or both of the first field or the second field of the R-bit codeword, wherein the comma patterns used in either or both of the first and second fields of the R-bit codeword differ from non-comma, data patterns used in the first and second fields, so as to allow a receiver to determine codeword boundaries, irrespective of whether a single or both of the first field or the second field of the R-bit codeword contain one of the plurality of predetermined comma patterns.

12. The method according to claim 11, wherein the comma patterns used in either or both of the first field or the second field of the R-bit codeword have a particular bit pattern that allows the comma patterns to retain their uniqueness even after a DC-balancing operation has been performed on the R-bit codeword containing one or more of the predetermined comma patterns, to thereby allow the receiver to determine the codeword boundaries by the comma patterns in the R-bit codeword, without the receiver having performed an inverse DC-balancing operation on the R-bit codeword in advance of detecting the comma patterns.

13. The method according to claim 2, wherein an R-bit codeword space includes a plurality of pairs of R-bit codewords that have a same weight but a different polarity with respect to each other, in which one codeword in each of the pairs of R-bit codewords correspond to a plurality of two-bit sub-codewords having a most-significant bit inverted with respect to a correspondingly positioned sub-codeword in the other codeword in said each of the pairs of R-bit codewords.

14. The method according to claim 2, wherein each of the R-bit codewords includes information that enables a receiver to determine whether or not a reverse DC-balancing operation needs to be performed before the receiver performs a decoding of the R-bit codeword.

15. The method according to claim 14, wherein the information included in each of the R-bit codewords regarding DC-balancing is provided in a first of the plurality of PAM-L symbols that represent each respective R-bit codeword on the single transmission medium.

16. A method for transmitting digital signals in a multi-level signaling system wherein digital signals representing more than one bit of information may be transmitted at more than two signal levels on a single transmission medium, the method comprising the steps of:

encoding digital values represented by sets of N bits to provide corresponding sets of P symbols, each set of P symbols being selected to provide at least one one-step transition between adjacent symbols in the set of P symbols, in a PAM-L encoding scheme; and transmitting the sets of P symbols on the single transmission line, wherein N and P are integer values, and L is an integer value equal to or greater than four, wherein the PAM-L encoding scheme corresponds to PAM-4, and wherein the transmitted information is capable of being represented by four different symbols respectively representing four different steps, with 00 representing a first step, 01 representing a second step, 11 representing a third step, and 10 representing a fourth step.

17. The method according to claim 16, wherein each of the four steps is assigned a weight, the method further comprising:

defining a codeword space in which the sets of N bits are assigned to R-bit codewords, in which the codeword space includes a plurality of pairs of R-bit codewords of equal weight but of opposite polarity;

determining a current disparity on the single transmission line;

assigning one of the pair of R-bit codewords corresponding to each of the sets of N bits in such a manner such that the current disparity becomes closer to zero; and transmitting, on the single transmission medium, the assigned one of the pair of R-bit codewords as a corresponding set of P symbols in the PAM-L encoding scheme.

18. A method for transmitting digital signals in a multi-level signaling system wherein digital signals representing more than one bit of information may be transmitted at more than two signal levels on a single transmission medium, the method comprising the steps of:

encoding digital values represented by sets of N bits to provide corresponding sets of P symbols, each set of P symbols being selected to provide at least one one-step transition between adjacent symbols in the set of P symbols, in a PAM-L encoding scheme; and transmitting the sets of P symbols on the single transmission line, wherein N and P are integer values, and L is an integer value equal to or greater than four, and wherein the encoding step is performed so as to achieve clock data recovery at a receiver that receives the sets of P symbols on the single transmission line.

19. A system for transmitting digital signals in a multi-level signaling system wherein digital signals representing more than one bit of information may be transmitted at more than two signal levels on a single transmission medium, the system comprising:

an encoding unit configured to encode digital values represented by two consecutive N-bit characters into an R-bit codeword, wherein the R-bit codeword is configured so as to reduce full swings, each of the N-bit characters being designated as either data or control information based on a Q-bit tag associated with each of the N-bit characters; and a transmitting unit configured to output the R-bit codeword as a plurality of PAM-L symbols, wherein L, N, R and Q are positive integer values, and wherein the R-bit codeword includes a first field that corresponds to a first of the two consecutive N-bit characters and its associated Q-bit tag, a second field that corresponds to a second of the two consecutive N-bit characters and its associated Q-bit tag, and a third field provided between the first and second fields that is a function of the two consecutive N-bit characters and their associated Q-bit tags.

20. The system according to claim 19, wherein the encoding unit performs encoding without regard to DC-balancing, the system further comprising:

a determining unit configured to determine if the R-bit codeword should be modified to provide DC-balancing, without affecting full swing elimination; and if it is determined that the R-bit codeword should be modified to provide DC-balancing, the determining unit is configured to modify the R-bit codeword to another R-bit codeword of an opposite polarity weight as the R-bit codeword.

21. The system according to claim 20, wherein the encoding unit comprises:

a mapping unit configured to map at least one of the two consecutive N-bit characters into a different bit pattern, for the purpose of eliminating full swings in the R-bit codeword.

22. The system according to claim 20, wherein the encoding unit comprises a plurality of encoding units, and wherein the encoding is performed on each of the two consecutive N-bit characters by the plurality of encoding units independent of each other.

23. The system according to claim 20, wherein the encoding unit comprises a plurality of encoding units, and wherein the encoding is performed on each of the two consecutive N-bit characters by the plurality of encoding units in parallel to each other.

24. The system according to claim 20, wherein the encoding that is performed by the encoding unit on each of the two consecutive N-bit characters is substantially the same.

25. The system according to claim 20, wherein the encoding that is performed by the encoding unit on one of the two consecutive N-bit characters differs from the encoding that is performed by the encoding unit on the other of the two consecutive N-bit characters due to a different arrangement of encoded bits.

26. The system according to claim 19, wherein the third field in the R-bit codeword is a bit string that is set to a particular bit string value based on whether the first, the second, both or none of the two consecutive N-bit characters are mapped into a different bit pattern, wherein the third field in the R-bit codeword is provided so as to ensure that no full-swing violation occur at beginning and ending boundaries of the third field.

27. The system according to claim 19, further comprising:

a transmitting unit configured to transmit each R-bit codeword as a plurality of sets of symbols over the single transmission medium.

28. The system according to claim 19, wherein the plurality of sets of symbols corresponds to 10 PAM-4 symbols.

29. The system according to claim 19, wherein the encoding unit comprises:

a determining unit configured to determine a current disparity on the single transmission medium; and an assigning unit configured to assign each R-bit codeword to one codeword out of a pair of codewords having a same weight but a different polarity with respect to each other, such that the current disparity becomes closer to zero, thereby achieving DC balancing on the single transmission medium as a result.

30. The system according to claim 19, wherein the encoding unit comprises:

a determining unit configured to determine whether a comma is to be provided in the R-bit codeword, and if so, performing codeword mapping to include one of a plurality of predetermined comma patterns in either or both of the first field or the second field of the R-bit codeword, wherein the comma patterns used in either or both of the first and second fields of the R-bit codeword differ from non-comma, data patterns used in the first and second fields, so as to allow a receiver to determine codeword boundaries, irrespective of whether a single or both of the first field or the second field of the R-bit codeword contain one of the plurality of predetermined comma patterns.

31. The system according to claim 30, wherein the comma patterns used in either or both of the first field or the second field of the R-bit codeword have a particular bit pattern that allows the comma patterns to retain their uniqueness even after a DC-balancing operation has been performed on the R-bit codeword containing one or more of the predetermined comma patterns, to thereby allow the receiver to determine the codeword boundaries by the comma patterns in the R-bit codeword, without the receiver having performed an inverse DC-balancing operation on the R-bit codeword in advance of detecting the comma patterns.

32. The system according to claim 19, wherein an R-bit codeword space includes a plurality of pairs of R-bit codewords that have a same weight but a different polarity with respect to each other, in which one codeword in each of the pairs of R-bit codewords correspond to a plurality of two-bit sub-codewords having a most-significant bit inverted with respect to a correspondingly positioned sub-codeword in the other codeword in said each of the pairs of R-bit codewords.

33. The system according to claim 19, wherein each of the R-bit codewords includes information that enables a receiver to determine whether or not a reverse DC-balancing operation needs to be performed before the receiver performs a decoding of the R-bit codeword.

34. The system according to claim 33, wherein the information included in each of the R-bit codewords regarding DC-balancing is provided in a first of the plurality of PAM-L symbols that represent each respective R-bit codeword on the single transmission medium.

35. A system for transmitting digital signals in a multi-level signaling system wherein digital signals representing more than one bit of information may be transmitted at more than two signal levels on a single transmission medium, the system comprising:

an encoding unit configured to encode digital values represented by sets of N bits to provide corresponding sets of P symbols, each set of P symbols being selected to provide at least one one-step transition between adjacent symbols in the set of P symbols, in a PAM-L encoding scheme; and a transmitting unit configured to transmit the sets of P symbols on the single transmission line, wherein N and P are integer values, L being an integer value equal to four or an integer multiple of four, and wherein the encoding scheme is a PAM-4 encoding scheme, in which the transmitted information is capable of being represented by four different symbols respectively representing four different steps, with 00 representing a first step, 01 representing a second step, 11 representing a third step, and 10 representing a fourth step.

36. The system according to claim 35, wherein each of the four steps is assigned a weight, the system further comprising:

a defining unit configured to define a codeword space in which the sets of N bits are assigned to R-bit codewords, in which the codeword space includes a plurality of pairs of R-bit codewords of equal weight but of opposite polarity;

a determining unit configured to determine a current disparity on the single transmission line;

an assigning unit configured to assign one of the pair of R-bit codewords corresponding to each of the sets of N bits in a manner such that the current disparity becomes closer to zero; and a transmitting unit configured to transmit, on the single transmission line, the assigned one of the pair of R-bit codewords as a corresponding set of P symbols in the PAM-L encoding scheme.

* * * * *